(12) United States Patent
Khalak et al.

(10) Patent No.: US 12,073,470 B2
(45) Date of Patent: Aug. 27, 2024

(54) MACHINE STRUCTURED PLAN DESCRIPTION

(71) Applicant: CollectiveHealth, Inc., San Mateo, CA (US)

(72) Inventors: Asif Khalak, Belmont, CA (US); Sergio Martinez-Ortuno, Oakland, CA (US); Henning Chiv, Castro Valley, CA (US); Michelle Alicia Gard, San Mateo, CA (US); Emma Louise Wise, San Francisco, CA (US)

(73) Assignee: CollectiveHealth, Inc., San Francisco, CA (US)

( * ) Notice: Subject to any disclaimer, the term of this patent is extended or adjusted under 35 U.S.C. 154(b) by 15 days.

(21) Appl. No.: 17/867,365

(22) Filed: Jul. 18, 2022

(65) Prior Publication Data

US 2023/0044782 A1 Feb. 9, 2023

Related U.S. Application Data

(63) Continuation of application No. 16/730,808, filed on Dec. 30, 2019, now Pat. No. 11,393,039, which is a
(Continued)

(51) Int. Cl.
G06Q 40/08 (2012.01)
G06Q 10/1057 (2023.01)

(52) U.S. Cl.
CPC ......... *G06Q 40/08* (2013.01); *G06Q 10/1057* (2013.01)

(58) Field of Classification Search
CPC ............................ G06Q 40/08; G06Q 40/1057
(Continued)

(56) References Cited

U.S. PATENT DOCUMENTS 5,339,419 A  8/1994 Chan et al.
6,235,176 B1  5/2001 Schoen et al.
(Continued)

FOREIGN PATENT DOCUMENTS

CA  2654617 A1  8/2010
GB  2462333 A  2/2010
(Continued)

OTHER PUBLICATIONS

Bnayahu et al., "Making Sense of Healthcare Benefits", retrieved on Dec. 15, 2020 at <<https://ieeexplore.ieee.org/document/6227116>>, IEEE, Jun. 2012, pp. 1034-1043.
(Continued)

*Primary Examiner* — Robert R Niquette
(74) *Attorney, Agent, or Firm* — Lee & Hayes, P.C.

(57) ABSTRACT

A plan authoring tool can receive user input describing parameters of benefits of a benefit plan. The plan authoring tool can convert the user input into a machine structured plan description (MSPD) that defines the benefit plan. The MSPD can be used by a plan documentation generator to generate one or more plan documents that explain the benefits and/or indicate how to manually adjudicate claims submitted in association with the benefit plan. The MSPD can also be used to automatically adjudicate claims. Plan analysis tools can be used to evaluate an MSPD to validate a new or edited benefit plan and/or provide user feedback on the benefit plan so that users, if desired, can revise the MSPD via the plan authoring tool.

20 Claims, 14 Drawing Sheets

Related U.S. Application Data continuation of application No. 16/107,262, filed on Aug. 21, 2018, now Pat. No. 10,552,915.

(58) Field of Classification Search
USPC .............................................. 705/4
See application file for complete search history.

(56) References Cited

U.S. PATENT DOCUMENTS

| | | | |
|---|---|---|---|
| 6,341,265 | B1 | 1/2002 | Provost et al. |
| 7,356,460 | B1 | 4/2008 | Kennedy et al. |
| 10,402,909 | B1 | 9/2019 | Khalak et al. |
| 10,467,379 | B2 | 11/2019 | Van Arkel |
| 10,552,915 | B1 | 2/2020 | Khalak et al. |
| 10,628,834 | B1 | 4/2020 | Agarwal et al. |
| 2002/0019754 | A1 | 2/2002 | Peterson et al. |
| 2003/0069760 | A1* | 4/2003 | Gelber .............. G06Q 10/10 705/2 |
| 2003/0191665 | A1 | 10/2003 | Fitzgerald |
| 2003/0229522 | A1 | 12/2003 | Thompson et al. |
| 2006/0080200 | A1* | 4/2006 | Ashton .............. G06Q 40/00 705/35 |
| 2006/0089862 | A1 | 4/2006 | Anandarao et al. |
| 2006/0195329 | A1 | 8/2006 | Choi et al. |
| 2008/0235202 | A1 | 9/2008 | Wang et al. |
| 2009/0295836 | A1 | 12/2009 | King |
| 2010/0031263 | A1 | 2/2010 | Lamothe |
| 2012/0109839 | A1* | 5/2012 | Anderson .......... G06Q 10/1057 705/322 |
| 2012/0166212 | A1 | 6/2012 | Campbell |
| 2015/0081324 | A1 | 3/2015 | Adjaoute |
| 2015/0370978 | A1 | 12/2015 | Van Arkel |
| 2016/0267396 | A1 | 9/2016 | Gray et al. |
| 2017/0017760 | A1 | 1/2017 | Freese et al. |
| 2017/0293894 | A1 | 10/2017 | Taliwal et al. |
| 2018/0239870 | A1 | 8/2018 | Goldman et al. |
| 2018/0349487 | A1 | 12/2018 | Garg et al. |
| 2019/0005198 | A1 | 1/2019 | Richards et al. |
| 2019/0073641 | A1 | 3/2019 | Utke |
| 2020/0065907 | A1 | 2/2020 | Khalak et al. |
| 2020/0134736 | A1 | 4/2020 | Khalak et al. |
| 2020/0364797 | A1 | 11/2020 | Halpern-Manners et al. |
| 2021/0375490 | A1 | 12/2021 | Brown |
| 2023/0010687 | A1 | 1/2023 | Halpern-Manners |
| 2023/0044782 | A1* | 2/2023 | Khalak .............. G06Q 10/1057 |
| 2023/0316412 | A1 | 10/2023 | Behrens |

FOREIGN PATENT DOCUMENTS

| | | |
|---|---|---|
| GB | 2465766 A | 6/2010 |
| WO | WO02077753 | 10/2002 |
| WO | WO2013159178 A1 | 2/2013 |
| WO | WO2019041804 A1 | 3/2019 |
| WO | WO2019100595 A1 | 5/2019 |

OTHER PUBLICATIONS

Dictionary.com, "Machine Learning", retrieved from <<https://www.dictionary.com/browse/machine-learning>>, Mar. 24, 2016, 1 page.

Kumar, et al., "Data Mining to Predict and Prevent Errors in Health Insurance Claims Prosessing", Analytics Vidhya, retrieved at https://www.analyticsvidhya.com/blog/2017/09/common-machine-learning-algorithms/>>2017, 9 pgs.

Office Action for U.S. Appl. No. 16/414,673, mailed on Jul. 23, 2021, Halpern-Manners, "Routing Claims From Automatic Adjudication System to User Interface", 30 Pages.

Non Final Office Action dated Aug. 27, 2020 for U.S. Appl. No. 16/414,673, "Routing Claims From Automatic Adjudication System to User Interface", Manners, 40 pages.

Office Action for U.S. Appl. No. 16/555,511, mailed on Jan. 13, 2021, Khalak, "Machine Structured Plan Description", 8 pages.

Office Action for U.S. Appl. No. 16/414,673, mailed on Jan. 15, 2021, Halpern-Manners, "Routing Claims From Automatic Adjudication System to User Interface", 34 pages.

Office Action for U.S. Appl. No. 16/107,262, mailed on Oct. 31, 2018, Khalak et al., "Machine Structured Plan Description", 10 pages.

Office Action for U.S. Appl. No. 16/414,673, mailed on Nov. 17, 2021, Halpern-Manners, "Routing Claims From Automatic Adjudication System to User Interface", 32 Pages.

Office Action for U.S. Appl. No. 16/107,396, mailed on Nov. 8, 2018, Khalak et al., "Machine Structured Plan Description", 14 pages.

Office Action for U.S. Appl. No. 16/107,262, mailed on Apr. 24, 2019, Khalak et al., "Machine Structured Plan Description", 7 pages.

Ramamurthy, "A Configurable, Big Data System for On-Demand Healthcare Cost Prediction", retrieved at <<https://ieeexplore.ieee.org/stamp/stamp.jsp?tp=&amumber=8258086>>, 2017, pp. 1524-1533.

Ray, "Commonly used Machine Learning Algorithms ( with Python and R Codes)", Analytics Vidhya, retrieved at <<https://www.analyticsvidhya.com/blg/2017/09/common-machine-learning-algorithms/>>, 2017, 69 pgs.

Wojtusiak, et al., "Rule-based Prediction of Medical Claims' Payments: A Method and Initial Application to Medicaid Data", retrieved on Dec. 15, 2020 at <<https://ieeexplore.ieee.org/document/6147666?source=IQplus>>, Dec. 2011, pp. 162-167.

Janusz Wojtusiak, et al. "Rule-Based Prediction of Medical Claims' Payments: A Method and Initial Application to Medicaid Data" dated Dec 2011, https://ieeexplore.ieee.org/documenU6147666?source=IQplus (Year: 2011) 6 pages.

Office Action for U.S. Appl. No. 17/945,976, mailed on Aug. 29, 2023, Nicholas Halpern-Manners, "Routing Claims From Automatic Adjudication System to User Interface", 44 pages.

Office Action for U.S. Appl. No. 17/945,976, mailed on May 9, 2023, Halpern-Manners, "Routing Claims From Automatic Adjudication System to User Interface", 41 pages.

* cited by examiner

Machine Structured Plan Description (MSPD)
102

Plan Object 202A:
    Attribute 204A(1)
    Attribute 204A(2)
    ...
    Attribute 204A(N)
Plan Object 202B:
    Attribute 204B(1) = Plan Object 202C:
        Attribute 204C(1)
        ...
        Attribute 204C(N)
    ...
    Attribute 204B(N)
...
Plan Object 202N:
    Attribute 204N(1)
    ...
    Attribute 204N(N)

```
"accumulators": [
    {
            "name": "deductible",
308 →    "network_tier": "inn",
            "owner_type": "family",
            "limit": {
                    "SUBSCRIBER": 1000.0,
                    "SUBSCRIBER_ONE_CHILD": 1000.0,
                    "SUBSCRIBER_SPOUSE": 1000.0,
                    ...},
            ...},
    {
            "name": "oop_max",
310 →    "network_tier": "inn",
            "owner_type": "family",
            "limit": {
                    "SUBSCRIBER": 6000.0,
                    "SUBSCRIBER_ONE_CHILD": 6000.0,
                    "SUBSCRIBER_SPOUSE": 6000.0,
                    ...},
            ...},
    {
            "name": "deductible"
312 →    "network_tier": "oon",
            "owner_type": "individual",
            "limit": {
                    "SUBSCRIBER": 1000.0,
                    "SUBSCRIBER_ONE_CHILD": 1000.0,
                    "SUBSCRIBER_SPOUSE": 1000.0,
                    ...},
            "crossaccumulates_to": [{
                    "name": "deductible",
                    "network_tier": "inn",
                    "owner_type": "individual"}],
            "embedded_in": [{
                    "name": "deductible",
                    "network_tier": "oon",
                    "owner_type": "family"}],
            ...},
    ...
]
```

FIG. 3C

306 →
```
"medical_benefits_cost_sharing": [
    {
        "ch_code": "HOP450",
        "network_tier": "inn",
        "stage_sequence": [
            {
                "alpha": 1.0,
                "member_fixed_max": null,
                "member_accumulation_entrypoints": [
                    {
                        "name": "deductible",
                        "network_tier": "inn",
                        "owner_type": "individual"},
                    ...],
                "member_amount_label": "deductible_amount",
                "member_amount_limits": [
                    {
                        "name": "oop_max",
                        "network_tier": "inn",
                        "owner_type": "individual"},
                    {
                        "name": "deductible",
                        "network_tier": "inn",
                        "owner_type": "family"},
                    ...],
                "sponsor_amount_label": "benefit_amount",
                ...},
            {
                "alpha": 0.1,
                "member_fixed_max": null,
                "member_accumulation_entrypoints": [
                    {
                        "name": "oop_max",
                        "network_tier": "inn",
                        "owner_type": "individual"}],
                "member_amount_label": "alpha_amount",
                "member_amount_limits": [
                    {
                        "name": "oop_max",
                        "network_tier": "inn",
                        "owner_type": "individual"},
                    ...],
                "sponsor_amount_label": "benefit_amount",
                ...},
            ...]},
    ...]
```

314 → (points to "alpha": 1.0 block)
316 → (points to "alpha": 0.1 block)

FIG. 3D

MACHINE STRUCTURED PLAN DESCRIPTION

PRIORITY

This Application is a continuation of, and claims priority to, U.S. patent application Ser. No. 16/730,808, filed on Dec. 30, 2019, now known as U.S. Pat. No. 11,393,039, issued on Jul. 19, 2022, which is a continuation of U.S. patent application Ser. No. 16/107,262, filed on Aug. 21, 2018 and entitled "MACHINE STRUCTURED PLAN DESCRIPTION", now known as U.S. Pat. No. 10,552,915, issued on Feb. 4, 2020, the entire contents of which are incorporated herein by reference.

BACKGROUND

Administrators can offer and manage benefit plans that provide one or more benefits to plan participants. For example, a benefit plan can be a health plan that offers benefits that fully or partially cover the cost of certain medical services for plan participants. In some examples, an administrator can be a third party that administers a benefit plan on behalf of a sponsor, such as an employer that offers health plans to its employees via the administrator.

The benefits of a particular benefit plan can be explained to plan participants, potential plan participants, sponsors, personnel of the administrator, and/or other audiences through various types of documents. Claims submitted by providers or by plan participants can be adjudicated by the administrator according to the benefits of the benefit plan. For example, the administrator can adjudicate a claim to determine whether to approve or deny the claim, as well as to determine cost sharing parameters of an approved claim, such as how much of the cost of a covered service should be paid by the plan participant and how much should be paid by the sponsor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example data structure for an MSPD.

FIGS. 3A-3D depict elements of an example MSPD for a health plan.

DETAILED DESCRIPTION

Figure 1:
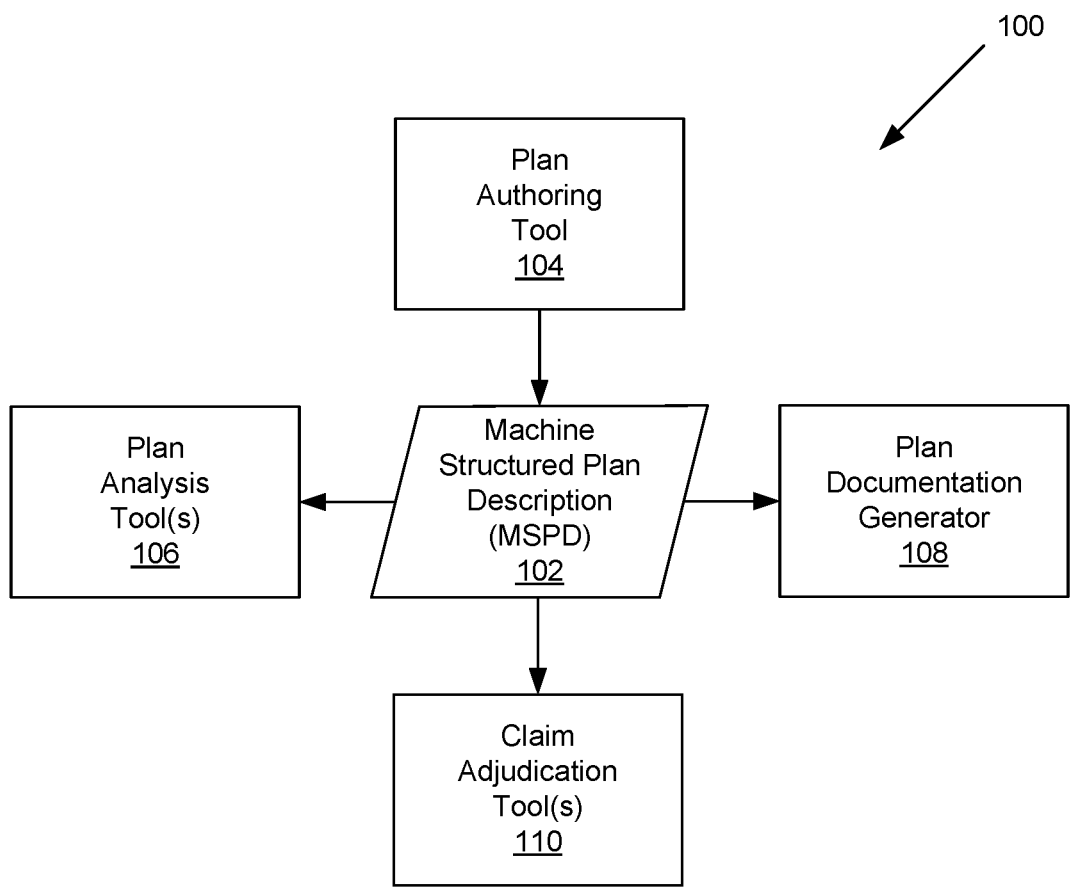
FIG. 1 depicts an example environment of a plan administration system that can create and use a machine structured plan description (MSPD).

A benefit plan can be a plan or policy that provides one or more benefits or services to plan participants. In some examples, a benefit plan can be a health plan that provides plan participants with benefits including coverage of one or more medical services. In other examples, a benefit plan can be a travel plan that offers various travel benefits, a real-estate lease, an investment portfolio plan, an employee perks and assistance plan, or any other type of plan or policy.

In some examples, an administrator can administer a benefit plan on behalf of a sponsor. For example, a sponsor can be an employer that offers a health plan to its employees, and the administrator can be a third-party entity that provides plan documentation to plan participants and potential plan participants of the health plan, as well as adjudicating claims against the health plan that have been submitted by plan participants or by medical providers. In other examples, the sponsor can be an insurance company or any other entity that offers a benefit plan, but uses a third-party administrator to administer the benefit plan. In still other examples, the administrator can itself be an insurance company or other entity that directly offers a benefit plan.

Claims can be filed by various parties against a benefit plan to track usage of benefits, to have the administrator determine whether a provided service is covered by the benefit plan, to have the administrator determine a cost sharing arrangement between parties for a provided service, and/or for other reasons. For example, a sponsor of a benefit plan may submit claims in order to track how benefits are being used by plan participants. In some cases, such sponsor-submitted claims can be submitted to help keep track of how certain benefits are being used by plan participants, and accordingly may be submitted as zero dollar value claims. In other cases, such sponsor-submitted claims can be submitted to determine a cost-sharing arrangement between the sponsor and a plan participant for a particular provided service. Claims can also include claims submitted by service providers that have rendered services to plan participants. Such service providers can include in-network providers associated with the benefit plan and out-of-network providers that are not associated with the benefit plan, such that plan participants may be liable for a higher portion of the cost of a service provided by an out-of-network provider. Claims can also be submitted by plan participants to request reimbursement of costs paid to obtain services.

When a claim is submitted, the administrator can adjudicate the claim to determine whether to approve or deny the claim. If the claim is approved, the administrator may determine a cost sharing arrangement between the plan participant and a sponsor or another entity associated with the benefit plan. In some examples, administrator personnel can manually adjudicate claims, although an administrator may also have automatic claims adjudication systems that can be configured to adjudicate claims according to particular benefit plans.

For example, when the benefit plan is a health plan, a medical provider that has rendered services to a plan participant can file a claim against the health plan for the cost of those services. The administrator can then adjudicate the claim. For instance, as part of the adjudication, the administrator may determine that the plan participant is liable for paying 20% of the cost of the services, while the health plan's sponsor should pay the remaining 80%.

As another example, when the benefit plan is a real-estate lease in which a landlord provides various benefits to a tenant in exchange for rent payments according to the benefit plan, a claim can be a request by a tenant for reimbursement of a repair cost. In this example, the adjudication can involve determining how much of the repair cost is to be reimbursed by the landlord and how much is to be borne by the tenant. As yet another example, when the benefit plan is a travel club membership plan, a claim can be a request by a plan participant to book a hotel room at a discounted rate, and the adjudication can involve determining how much of the hotel room's full rate is to be paid by the plan participant and how much is to be paid by a sponsor.

An administrator can create plan documents that explain elements of a benefit plan to one or more audiences, including plan participants, potential plan participants, sponsors, providers, administrator personnel, and other entities. For example, potential plan participants can use documentation about a benefit plan to decide whether the benefit plan provides sufficient coverage for their individual needs. As another example, existing plan participants can use documentation about a benefit plan to determine the scope of their coverage and/or determine if certain services are covered by the benefit plan. As yet another example, administrator personnel can internally use documentation about a benefit plan to manually determine whether a claim filed against the benefit plan should be approved or denied, and/or to manually determine if a plan participant is liable for a portion of the cost of a service identified in the claim.

By way of various non-limiting examples, plan documents can include a summary of plan description (SPD), a summary of benefits coverage (SBC), content for websites and applications that explain benefits of a benefit plan to existing plan participants or to potential plan participants (e.g., during an enrollment period, etc.), and/or any other type of plan document. As noted above, plan documents produced by an administrator can also include internal documents that explain elements of the same benefit plan to the administrator's own personnel, such as documents that describe procedures and rules for adjudicating claims associated with the benefit plan.

Conventionally, one or more individuals create the terms and conditions of a benefit plan, such as individuals working for an administrator and/or a sponsor. For example, in some conventional systems, personnel of an administrator can input details of a draft benefit plan into a form, such as a spreadsheet or other document that describes covered benefits, cost sharing parameters associated with those benefits, eligibility criteria, and other information. The administrator can then send the form containing the details of the draft benefit plan to a plan sponsor for review and approval, such that the administrator and the sponsor can collaborate on the creation of a benefit plan.

However, in conventional systems, after a new benefit plan has been approved, many different individuals may need to independently interpret the benefit plan's details. For example, different individuals in various teams can be tasked with creating plan documents that explain or interpret the exact same benefits in different ways for different audiences and/or different independent systems, such as documents for plan participants, potential plan participants, sponsors, providers, claims adjudicators, customer service personnel, consultants, and any other entities, as well as multilingual translations of such documents. Additionally, various programmers may need to interpret the same benefit plan to create portals or other websites that explain the benefit plan's benefits to one or more of these disparate audiences, or to program automatic adjudication systems that adjudicate claims according to the benefit plan's benefits. Moreover, administrators may administer multiple benefit plans across disparate clients, plan benefits, plan rules, plan memberships, and jurisdictions, further compounding these issues.

Unfortunately, some benefit plans can be enormously complex and difficult to describe using conventional systems. For example, some health plans can include hundreds of interrelated benefits and complex cost-sharing and accounting mechanisms, such that a particular service may or may not be covered for a particular plan participant based on deductible limits or various accumulators. Accordingly, having many people manually produce documents and code according to their own interpretations of the same benefit plan is not only laborious, but can also introduce risks due to inconsistent and potentially inaccurate interpretations, misunderstandings, and/or human error. For example, if different authors interpret the same benefit in different ways, the different plan documents they produce may explain the same benefit inconsistently, and/or may be inconsistent with applicable legal standards or the intent of the plan sponsor. Human error can also cause plan documents to be incorrectly or inconsistently described or applied, and/or cause automated claims adjudication systems to be coded incorrectly or inconsistently with respect to benefits of a benefit plan. These issues can create confusion and frustration when different or erroneous information is conveyed to different audiences, cause time consuming and expensive errors in claims adjudication, cause errors in reimbursement for claims, and other problems.

Manually fixing such inconsistencies and resolving such problems between independent systems can be expensive and time consuming for the administrator as administrators must typically employ teams of professionals and legal counsel to address inconsistencies in plan description, interpretation, and application. Furthermore, manually correcting such inconsistencies and resolving such problems can require significant manual and/or computational resources, for instance if hard coded automatic adjudication systems must be reprogrammed.

Similarly, in conventional systems it can be expensive, laborious, and time consuming for an administrator to update plan documents and automated systems when an existing benefit plan is updated, such as when a health plan is updated annually or at any other time. For example, many conventional automated claims adjudication systems and plan websites are hard coded to reflect the benefits of a particular benefit plan or type of benefit plan. Not only does this require programmers to hard code multiple different automatic claims adjudication systems and websites for multiple different benefit plans or types of benefit plans (requiring significant manual and computational effort), when a particular benefit plan is updated, the corresponding automatic claims adjudication system and websites also need to be manually reprogrammed. Similarly, any previously produced plan documents associated with an updated benefit plan, such as other electronic and printed documents, may need to be edited to reflect updated information. These laborious processes must be repeated for every individual benefit plan that is updated. This introduces risk of error and liability if different plan documents are inconsistently updated, or if plan documents are updated at different times.

Due to the time, effort, cost, risk of error, computational resources, and business resources described above that may be needed to create and update systems and plan documents for benefit plans across multiple plan sponsors in conventional systems, many conventional systems may not able to keep up with desires of sponsors to offer flexible benefit plans that can be quickly updated or customized. For example, a sponsor may want to update a benefit plan to offer a more attractive package of benefits to plan participants, such as a benefit plan that includes non-traditional benefits or that better integrates with certain third-party service providers, or that updates benefits to cover access to durable medical equipment that was not previously covered by the benefit plan but would provide savings to the sponsor even if that change has little perceived value to plan participants. However, as described above, conventionally creating or updating a benefit plan to include such new or updated benefits is typically a time consuming, expensive, and error-prone process.

Accordingly, what is needed are automatic systems and processes for accurately and quickly creating and updating benefit plans, corresponding plan documentation, and automatic claims adjudication systems, such that information about the benefits covered by a benefit plan is consistently and accurately reflected in plan documents for multiple audiences and in the automatic claims adjudication systems.

Described herein are systems and processes by which a benefit plan can be defined by data stored in a machine structured plan description (MSPD). An MSPD can express elements of a benefit plan using a domain specific language, and the MSPD can be formatted such that it is machine readable. For example, the MSPD can include a collection of JavaScript Object Notation (JSON) objects. In some cases, although the domain specific language may not express information about a benefit plan in natural language, some or all of the elements of an MSPD may also be human readable.

Information in an MSPD that defines a benefit plan can be used to automatically create plan documents, as well as to automatically adjudicate claims associated with that benefit plan. Because automatic generation of the plan documents and automatic claims adjudication can be performed based on the same underlying information about a benefit plan stored in the same MSPD, each operation can be consistent. For example, multiple plan documents can be automatically produced for different audiences or purposes based on data in the same MSPD. Because each plan document can be generated automatically from the same underlying data, each generated plan document can describe benefits consistently and can be applied consistently. This can reduce risks caused by the potential for human error during manual generation of plan documents, can lower the cost of generating plan documents, and can also reduce the time needed to produce such documents. Additionally, if the information about a benefit plan is updated in an MSPD, updated plan documents can be automatically generated that accurately and consistently explain the updated information. An automatic claims adjudication system can also base its decisions on benefit information in the same MSPD that is used to automatically generate plan documents, and accordingly claims can be automatically adjudicated in a manner that is consistent with how the automatically generated plan documents explain benefits. Accordingly, use of an MSPD can significantly reduce the potential risk, error, time, and cost associated with conventionally creating, updating, and/or applying benefit plans.

Information about a benefit plan stored in an MSPD can also be used to automatically simulate potential outcomes of that benefit plan, using the MSPD as a single source of truth for modeling computations which would otherwise need to be separately and manually hard-coded for each variant of the benefit plan. Accordingly, an administrator can prepare a new or updated benefit plan by editing information stored in an MSPD until simulation results are deemed acceptable. Different variants of a benefit plan can also be tested by simulating the performance of MSPDs that contain different parameters. The simulations of a draft benefit plan defined by an MSPD can be highly accurate and well-correlated to the administrator's changes, because the simulations can use the same underlying MSPD that would be used to generate plan documents and to adjudicate claims if that draft benefit plan were adopted.

Generating an MSPD that defines a benefit plan, and using that MSPD to both generate plan documents and to automatically adjudicate claims can offer significant benefits relative to conventional benefit adjudication systems. As mentioned above, producing plan documents based on the interpretations of many different human authors can introduce inconsistencies to the administration of benefit plans. However, generating multiple plan documents from the same underlying MSPD can help ensure that all of the plan documents express consistent information in human readable form. Also as mentioned above, automatic adjudication systems have conventionally been hard coded for specific benefit plans or specific types of benefit plans, which can be problematic because a programmer may have a different interpretation of a benefit plan than the author of corresponding plan documents, and because updating and maintaining multiple automatic adjudication systems can be time consuming, error prone, and use a large amount of manual and/or computational resources. However, MSPDs can allow the same automatic adjudication system to be flexible and support many different benefit plans without being recoded, which can significantly reduce the time, cost, and complexity associated with such an automatic adjudication system. For example, the same automatic adjudication system can adjudicate claims based on any benefit plan defined by an MSPD. The automatic adjudication system's use of an MSPD can also help ensure that all claims under a benefit plan are automatically adjudicated in a manner that is consistent with how benefits are explained in plan documents created from that MSPD.

Example Environments

FIG. 1 depicts an example environment of a plan administration system 100 that can create and use a machine structured plan description (MSPD) 102. An MSPD 102 can be a data structure that stores information about a benefit plan that is, or will be, provided and/or managed by an administrator. As described above, a benefit plan can be a plan or policy that provides one or more benefits or services to plan participants. In various examples, a benefit plan can be a health plan, a real-estate lease, a travel benefit plan, an investment portfolio plan, or any other type of plan or policy. In particular, an MSPD 102 can contain information that both indicates benefits provided to plan participants under the corresponding benefit plan, as well as indicating rules or instructions for how to adjudicate claims associated with those benefits.

An MSPD 102 can be created using a plan authoring tool 104. For example, a user working for the administrator or for a sponsor can use the plan authoring tool 104 to determine the benefits offered by a benefit plan, create a new benefit plan, or edit an existing benefit plan, and the plan authoring tool 104 can output an MSPD 102 that defines the new or edited benefit plan. One or more plan analysis tools 106 can validate the benefit plan defined by an MSPD 102 and/or perform simulations to determine expected outcomes associated with that benefit plan, and provide corresponding so that any desired modifications can be made to the benefit plan using the plan authoring tool 104 based on the feedback. The plan documentation generator 108 can generate one or more types of plan documents based on the MSPD 102 that consistently and accurately describe aspects of the benefit plan to plan participants, potential plan participants, personnel of the administrator, personnel of a sponsor, and/or any other audience. When claims are submitted against a benefit plan to the administrator, the claims can be adjudicated through one or more claim adjudication tools 110. The claim adjudication tools 110 can be used to automatically, or manually, adjudicate claims according to adjudication rules or instructions indicated by data in an MSPD 102. The MSPD 102, the plan authoring tool 104, the plan analysis tools 106, the plan documentation generator 108, and the claim adjudication tools 110 are described in more detail below.

FIG. 2 depicts an example data structure for an MSPD 102. An MSPD 102 can arrange data in a serialized data structure that includes one or more plan objects 202. Each plan object 202 can include one or more attributes 204 that describe specific elements of a benefit plan defined by the MSPD 102. Attributes 204 can express information about a plan object 202, such as an identifier for the plan object 202, information identifying other related plan objects 202 within the same MSPD 102, and information about how a claim that is associated with the plan object 202 should be adjudicated.

In some examples, an attribute 204 of a plan object 202 can itself be another plan object 202 that has its own attributes 204. This allows plan objects 202 of an MSPD 102 to be nested within each other using parent-child relationships at multiple levels within a directory structure. For example, FIG. 2 shows a child plan object 202C nested as an attribute 204B(1) of parent plan object 202B. Child plan object 202C can in turn have its own attributes 204C, which in some cases can be lower level child plan objects 202. In some examples, attributes 204 of a parent plan object 202 can apply to that plan object 202 as well as any of its child plan objects 202. However, in some cases attributes 204 of lower level plan objects 202 can be more specific to those lower level plan objects 202 and/or can override information stored in attributes 204 of higher level plan objects 202.

An MSPD 102 can store plan objects 202 and their attributes 204 as objects in a data structure. In some examples, an MSPD 102 can be stored using JavaScript Object Notation (JSON), in which plan objects 202 are stored as JSON objects, with their attributes 204 being are stored as name-value pairs of the JSON objects. In some cases, name-value pairs can include multiple values associated with the same name. In other examples, the object data in an MSPD 102 can be stored using any other format, such as Extensible Markup Language (XML) or YAML.

An MSPD's plan objects 202 and their attributes 204 can be represented using a domain specific language (DSL) that expresses semantic information about the associated benefit plan that can be used during automatic operations of tools including the plan authoring tool 104, the plan analysis tools 106, the plan documentation generator 108, and the claim adjudication tools 110 described below. For example, the claim adjudication tools 110 can include an interpreter or compiler that can use preconfigured code to convert the plan objects 202 and attributes 204 of any MSPD 102 expressed in the DSL into a set of rules for automatically adjudicating claims according to the benefit plan defined by the MSPD 102. As such, the same claim adjudication tools 110 can be configured to adjudicate claims based on any benefit plan without recoding the claim adjudication tools 110 by interpreting different MSPDs 102. This can save significant time and effort involved in conventional systems when benefit plans are created or updated and corresponding hard coded claim adjudication tools would need to be reprogrammed.

FIGS. 3A-3D depict elements of an example MSPD 102 that defines a health plan. In some examples, a health plan defined by an MSPD 102 can specify that different benefits and/or cost sharing arrangements may apply to a plan participant at different coverage stages. For example, coverage stages for a health plan can include different cost-sharing stages a plan participant goes through during the course of a health plan year, including an open enrollment stage, a pre-deductible stage in which deductible limits have not yet been met, a post-deductible stage after deductible limits have been met, and a stage in which out-of-pocket maximums have been met. Different cost sharing arrangements may apply to different coverage stages. For example, a plan participant may be liable for the cost of all covered services during a coverage stage before a deductible has been reached, a coinsurance percentage during a different coverage stage after a deductible has been reached but before an out-of-pocket maximum has been reached, and no portion of the cost during a later coverage stage after reaching the out-of-pocket maximum, with a plan sponsor covering any portion of the cost for which the plan participant is not liable.

To determine which coverage stage applies to a claim, an administrator can track a plan participant's expenses throughout the term of a health plan using one or more accumulators related to deductibles, out of pocket maximums, and/or other limits. For example, an administrator can track accumulators for individual deductibles, family deductibles, individual out-of-pocket maximums, family out-of-pocket maximums, deductibles and/or maximums for in-network providers, deductibles and/or maximums for out-of-network providers, and/or any other limit associated with a health plan. When an accumulator shows that a limit for a particular coverage stage has been reached, the administrator can adjudicate a claim for a subsequent service at the next coverage stage. In some examples, a claim can be adjudicated based on cost sharing parameters at all potentially applicable coverage stages, but only apply cost sharing parameters associated with those coverage stages when corresponding accumulator limits have been met or are not met. Although accumulators and coverage stages are described herein with respect to health plans, similar accumulators and coverage stages can be used in other types of benefit plans.

Figure 3A:
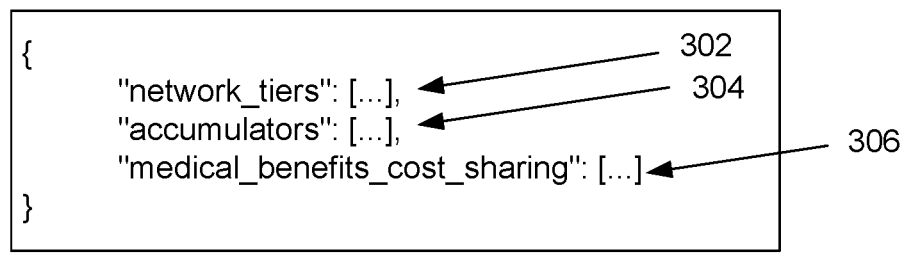

As shown in FIG. 3A, an MSPD 102 for a health plan can include different types of plan objects 202, including network tier plan objects 302 that define specific network tiers, accumulator plan objects 304 that define specific accumulators, and cost sharing plan objects 306 that define specific cost sharing parameters for specific services. The various plan objects 202 and attributes 204 of this example MSPD 102 can use a DSL defined for health plans that, for example, expresses information about accumulators and cost sharing parameters as well as the relationships between certain accumulators and cost sharing parameters for various services. This can allow plan objects 202 to be identified within the MSPD 102 that apply to a particular service at a particular coverage stage.

Figure 3B:
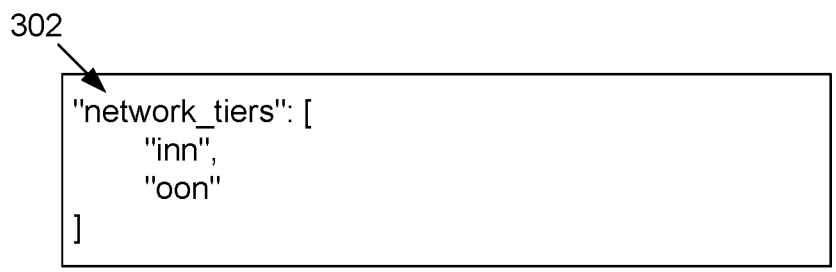

FIG. 3B depicts an example of the network tier plan object 302 shown in FIG. 3A. The network tier plan object 302 can include attributes 204 indicating that the health plan has information relating to two network tiers: "inn" for an in-network tier, and "oon" for an out-of-network tier." As will be explained below, accumulator plan objects 304 and/or cost sharing plan objects 306 can include attributes 204 that refer to such network tier attributes 204 in order to indicate those specific plan objects 202 apply to in-network coverage and not out-of-network coverage, or vice versa.

FIG. 3C depicts an example of the accumulator plan object 304 shown in FIG. 3A. The accumulator plan object's attributes 204 can include nested child plan objects 202 associated with specific accumulators associated with the health plan. For example, the parent accumulator plan object 304 can include a first child accumulator plan object 308 with attributes 204 indicating that it is associated with a family in-network deductible, with specific deductible limits for a subscriber, a subscriber with one child, a subscriber with a spouse, and/or other categories. The parent accumulator plan object 304 can also include a second child accumulator plan object 310 with attributes 204 indicating that it is associated with a family in-network out-of-pocket maximum. The parent accumulator plan object 304 can further include a third child accumulator plan object 312 with attributes 204 indicating that it is associated with an individual out-of-network deductible. Here, the third child accumulator plan object 312 can include attributes 204 identifying related accumulator plan objects 304, for instance indicating that any value applied to an accumulator for the individual out-of-network deductible should also be cross-accumulated to an individual in-network deductible, and that the individual out-of-network deductible is embedded within a family out-of-network deductible. For example, the "crossaccumulates_to" attribute 204 of the third child accumulator plan object 312 can include a triplet of attributes 204 including "name," "network_tier," and "owner_type" attributes 204, such that a different accumulator plan object 304 corresponding to a different accumulator identified by that triplet of attributes 204 can be identified within the MSPD 102. The parent accumulator plan object 304 can include any number of child accumulator plan objects 304 corresponding to different accumulators for different combinations of accumulator types or coverage stages, owner types, network tiers, and/or other parameters.

FIG. 3D depicts an example of the cost sharing plan object 306 shown in FIG. 3A. Multiple cost sharing plan objects 306 can be nested as child plan objects 202 within the cost sharing plan object 306 shown in FIG. 3A, although only one is shown in FIG. 3D for brevity.

A particular cost sharing plan object 306 can include attributes 204 regarding a particular service or benefit that is or is not covered by a benefit plan. For example, individual benefits that are covered or are not covered by the health plan can be represented by different cost sharing plan objects 306, such as a cost sharing plan object 306 for emergency services, another cost sharing plan object 306 for mental health services, another cost sharing plan object 306 for prenatal care services, and other cost sharing plan objects 306 for other services that are covered or are not covered by a health plan. In some examples, the same service can be represented by different cost sharing plan objects 306 for different network tiers. For example, an MSPD 102 can include a first cost sharing plan object 306 for in-network emergency services, and also include a second cost sharing plan object 306 for out-of-network emergency services.

Attributes 204 of a particular cost sharing plan object 306 for a benefit can include attributes 204 that express a name or a code for a medical service associated with that benefit, that identify a network tier to which the cost sharing plan object 306 is applicable, that identify coinsurance, copay, or other cost sharing values, that identify separate accumulator plan objects 304 within the MSPD 102 that describe accumulators that may be relevant to the benefit at one or more coverage stages, and/or other information. For example, a cost sharing plan object 306 can include a first attribute group 314 that includes attributes 204 applicable at one coverage stage, including triplets of attributes 204 that identify separate accumulator plan objects 304 for out of pocket maximums and deductibles that may be applicable to that coverage stage, as well as a second attribute group 316 that includes other attributes 208 identifying accumulator plan objects 304 relevant to a different coverage stage.

An MSPD 102 can include plan objects 202 that express information about benefits that are provided by a benefit plan, as well as information about benefits that are not provided by that benefit plan. This can allow the MSPD 102 to be unambiguous about which benefits the benefit plan does and does not cover. For example, an MSPD 102 for a health plan that does not cover bariatric surgery services can include a cost sharing plan object 306 for bariatric surgery, but indicate in an attribute 204 of that cost sharing plan object 202 that the benefit plan specifically does not provide any coverage for bariatric surgery.

An MSPD 102 may include other types of plan objects 202 and/or attributes 204. For example, a plan object 202 can include attributes 204 that define eligibility criteria for potential plan participants, such that characteristics of an individual who attempts to enroll in the benefit plan can be checked against those attributes 204 to confirm that the individual is eligible to enroll. As another example, a plan object 202 can include attributes 204 that indicate whether certain providers or types of providers are eligible to submit claims against a benefit plan.

The plan objects 202 of an MSPD 102 can be used by the tools discussed below to provide information to plan participants or other users about the benefit plan defined by the MSPD 102, and/or can be used as rules to administer claims associated with that benefit plan. For example, when a claim is submitted by a medical provider for a particular medical service rendered to a plan participant, the claim can include a code corresponding to a code in a cost sharing plan object 306. An automatic adjudication system 708 can accordingly look up that code to find matching cost sharing plan objects 306, possibly deciding on an in-network or out-of-network version based on the identity of the submitting medical provider. The automatic adjudication system 708 can also look up current values of accumulators associated with the plan participant to determine his or her current coverage stage, and use information in the cost sharing plan object 306 to identify applicable accumulator plan objects 304 that define deductibles, out-of-pocket maximums, or other limits associated with that coverage stage.

Figure 4:
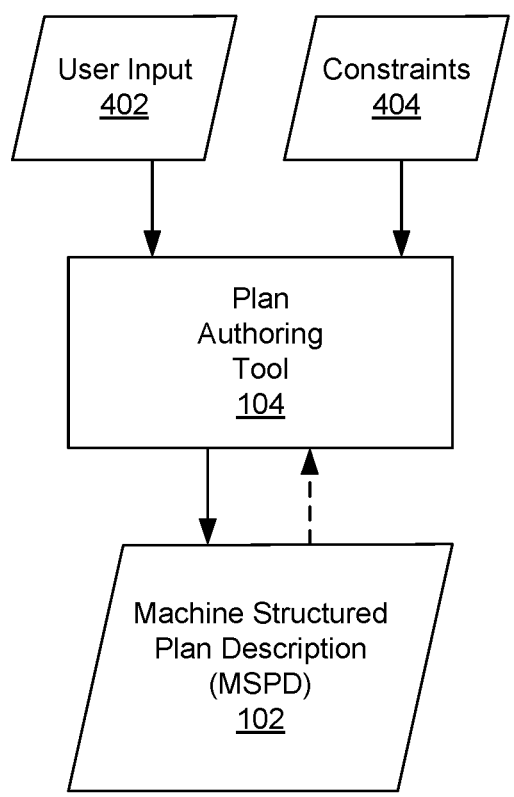
FIG. 4 depicts a plan authoring tool being used to generate an MSPD.

FIG. 4 depicts a plan authoring tool 104 being used to generate an MSPD 102. Unlike conventional systems, in which one or more users must author documents that describe a benefit plan, potentially inconsistently and/or inaccurately, the plan authoring tool 104 can generate a single MSPD 102 that fully defines a benefit plan by expressing benefits that are and are not covered with respect to one or more coverage stages. As will be discussed further below, the generated MSPD 102 can then be used to quickly generate plan documents 604 that are accurate and consistent with each other, as well as to automatically adjudicate claims in a manner consistent with how the benefits are explained in the plan documents 604.

A plan authoring tool 104 can include a user interface (UI) through which a user, such as personnel of an administrator or a plan sponsor, can provide user input 402 associated with one or more elements of a benefit plan. In some examples, the UI can allow a user to provide user input 402 in a form that is understood by the user, and the plan authoring tool 104 can then translate the provided user input 402, and/or other information, into an MSPD 102 that defines the benefit plan. For example, when an MSPD 102 is being generated for a health plan, the plan authoring tool 104 can display a UI to a user that allows the user to select options or provide other user input 402 related to one or more benefits that the health plan will or will not cover. The plan authoring tool 104 can translate and store user input 402 as one or more attributes 204 of one or more plan object 202 in an MSPD 102 using a DSL, including accumulator plan objects 304 and cost sharing plan objects 306. As will be explained below, the output MSPD 102 can be used to generate human readable plan documents 604, enables simulations to be run against the benefit plan options, and enables the benefit plan to be administered consistently.

In some examples, the plan authoring tool's UI can include one or more controls, such as sliders, drop down menus, checkboxes, or any other type of UI control, that can be manipulated by users to select between or adjust preconfigured options for user input 402. For example, the UI can display a moveable slider that represents a financial risk level associated with a particular benefit, such that moving the slider in one direction can lower a monthly cost but lower a coverage level according to preset values, while moving the slider in the other direction can increase the monthly cost and increase the coverage level. In other examples, the UI can accept manual user input 402, such as text or numerical input. For example, a user may be able to type in a desired copay amount for a particular coverage stage rather than selecting it from predefined options in the plan authoring tool's UI. In some examples, the UI can present various preconfigured options for user input 402, but also allow the user to manually adjust their user input 402 away from those preconfigured options if desired.

In some examples, the plan authoring tool 104 can be configured with one or more constraints 404 that restrict the types of user input 402 that can be accepted, define ranges of values that can be accepted in user input 402, define which types of user input 402 are required or are optional, and/or provide any other limits or restrictions on acceptable user input 402. In some examples, the constraints 404 can be provided to the plan authoring tool 104 as a configuration file or other type of data, such that the plan authoring tool 104 can be updated with new or different constraints 404 without changing the plan authoring tool's code or recompiling the plan authoring tool 104.

Constraints 404 provided to the plan authoring tool 104 can assist in ensuring that the benefit plan defined by the MSPD 102 meets legal requirements and/or requirements of the administrator. For example, legal requirements may require that a health plan cover mental health services at no cost to plan participants. Accordingly, constraints 404 can be configured by a programmer or other entity such that the plan authoring tool 104 will not accept user input 402 that specifies a cost to plan participants for mental health services. This can decrease the risks to administrators that an MSPD 102 generated by the plan authoring tool will be legally invalid, and also help avoid time and effort to re-author and/or re-code documents and systems for a benefit plan later found to be invalid. As another example, constraints 404 can reflect an administrator's policy that coinsurance percentages for a certain type of benefit at a certain coverage stage should not exceed 30%, and accordingly the plan authoring tool 104 can use those constraints 404 to prevent sliders or other controls for user input 402 associated with that coinsurance percentage from allowing users to select a percentage above 30%. As another example, constraints 404 can indicate that medical providers associated with two specific medical networks can be associated with a health plan instead of medical providers associated with twenty medical networks.

The plan authoring tool 104 can generate an MSPD 102 by translating provided user input 402, as limited by the constraints 404, into attributes 204 of one or more plan objects 202. In some examples, the plan authoring tool 104 can be configured with a schema stack that translates the user input 402 into the object-based structure of an MSPD 102. For example, when a user has provided user input 402 that defines parameters of a variety of benefits for services that are to be covered or not covered by a new health plan, such as cost sharing parameters associated with each of those benefits at one or more coverage stages, the plan authoring tool 104 can generate plan objects 202 with corresponding attributes 204 and store them in an MSPD 102. The plan authoring tool 104 can translate any provided user input 402, or other information about a service, into plan objects 202 and attributes 204 that are represented using the DSL.

In some examples, the plan authoring tool 104 can have, or be provided with, additional information that can be used to generate plan objects 202 of an MSPD 102. For example, constraints 404 or another type of configuration file can provide codes used by medical providers for various medical services. As such, while the plan authoring tool 104 may refer to a particular benefit for a medical service by name in its UI such that a user does not need to know the formal code for that service when entering associated user input 402, the plan authoring tool 104 can use information not directly provided by the user to store the code for that service within an attribute 204 of a corresponding cost sharing plan object 306. This can significantly improves the speed and accuracy of data entry while reducing the risk of error associated with manual code entry that is the hallmark of conventional methods of creating and updating benefit plans.

The plan authoring tool 104 can output an MSPD 102 for a benefit plan, and the MSPD 102 can be stored in a database or other memory location accessible to the plan administration system 100. In some examples, a stored MSPD 102 can be loaded back into the plan authoring tool 104 such that it can be edited based on new user input 402. As will be discussed below, in some cases a user can review a benefit plan defined by an MSPD 102 based on information generated from the MSPD 102 by plan analysis tools 106 and/or a plan documentation generator 108, and in response provide new user input 402 to adjust the MSPD 102 or to create a new version of the MSPD 102. Accordingly, a stored MSPD 102 can define a draft benefit plan during creation or editing of the benefit plan, or a final approved benefit plan that can be offered to potential plan participants during an enrollment period or plan participants that have enrolled in the benefit plan. In some examples, the plan authoring tool 104 can also support version control and auditability for generated MSPDs 102, such that users can review or roll back to older versions of an MSPD 102 at any time or review how an MSPD 102 was generated.

Figure 5:
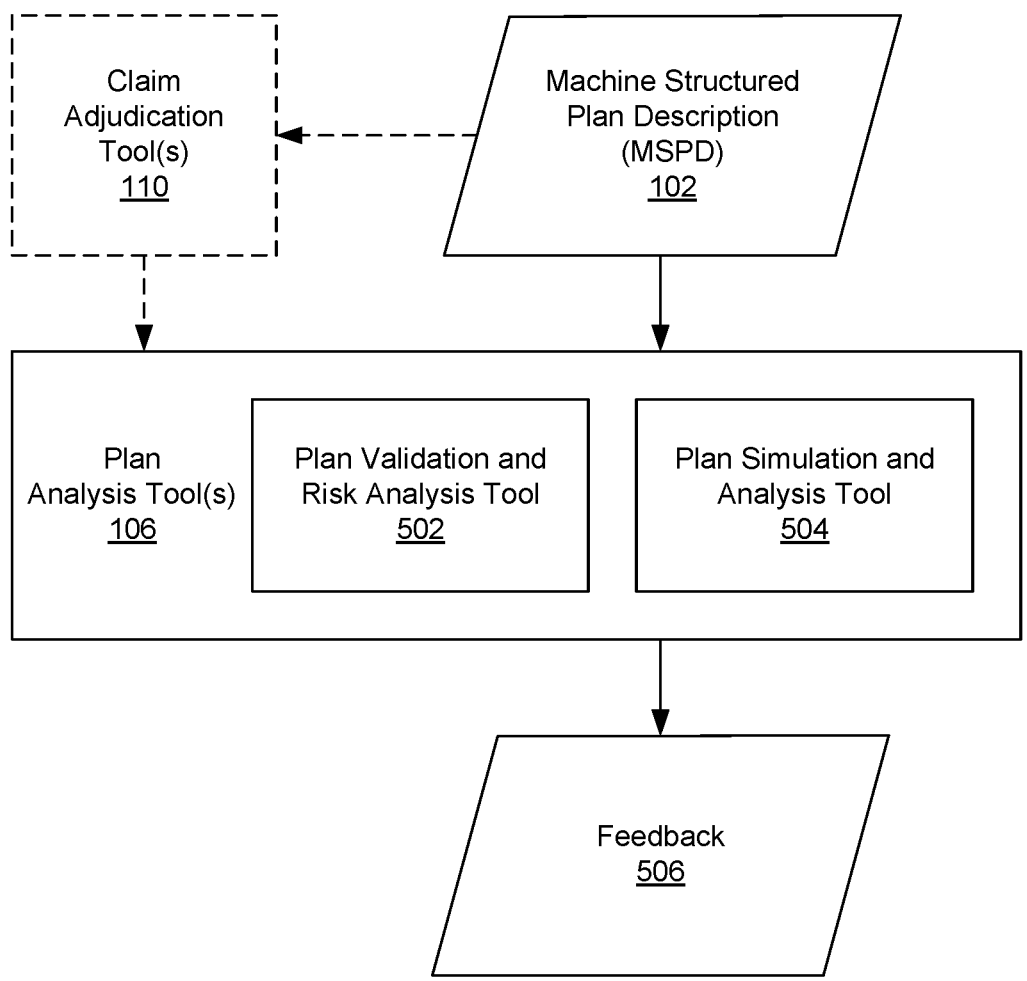
FIG. 5 depicts one or more plan analysis tools analyzing an MSPD.

FIG. 5 depicts one or more plan analysis tools 106 analyzing an MSPD 102. A MSPD 102 output by the plan authoring tool 104 can be provided to one or more plan analysis tools 106, including a plan validation and risk analysis tool 502 and a plan simulation and analysis tool 504. Any or all of the plan analysis tools 106 can generate feedback 506, which in some cases a user can review to determine if the user approves of the benefit plan defined by the MSPD 102 or wants to make changes. Feedback 506 can be generated as natural language text, graphs, charts, and/or information in any other format. In some examples, the feedback 506 can be displayed to a user in a UI displayed by the plan administration system 100. For instance, in some cases feedback 506 can be generated by plan analysis tools 106 after a new or edited MSPD 102 has been created by a plan authoring tool 104, and the feedback 506 can be displayed in the UI of the plan authoring tool 104 so that the user can review it and, if desired, make responsive changes within the plan authoring tool 104 to adjust the MSPD 102. In other examples, feedback 506 can be displayed to a user in any other UI or in a separate document or message, such as an email sent to the user after the plan analysis tools 106 have analyzed a new or edited MSPD 102. In still other examples, feedback 506 from the plan analysis tools 106 can be provided to the plan authoring tool 104 so that the plan authoring tool 104 can automatically edit an MSPD 102 according to the feedback 506.

In some examples, plan analysis tools 106 can be provided with information generated by the claim adjudication tools 110, such as information about real claims submitted in the past to the claim adjudication tools 110 and/or results indicating how those real claims were adjudicated through manual adjudication or via the automatic adjudication system 708 discussed below. Information about such real claims can be provided by the claim adjudication tools 110 as data sets for use by the plan analysis tools 106.

A plan validation and risk analysis tool 502 can identify redundant elements of an MSPD 102 and/or determine whether its plan objects 202 and attributes 204 meet one or more validation conditions. Validation conditions can be configured to check that a benefit plan defined by an MSPD 102 is valid, complies with regulations, is free of semantic errors, meets risk tolerance thresholds or other administrator policies, and/or meets any other condition.

Some validation conditions can be legal requirements, administrator requirements, or plan sponsor requirements that a benefit plan must meet to be considered valid. While some of these requirements can be enforced by disallowing initial user input 402 that would not meet those requirements according to constraints 404 at the plan authoring tool 104, the plan validation and risk analysis tool 502 can also check that an outputted MSPD 102 meets such requirements. For example, a particular requirement may be violated by a semantic interaction between different parameters of a benefit plan, even if the user input 402 provided for each parameter met constraints 404 for those specific parameters individually, and accordingly the plan validation and risk analysis tool 502 can review the MSPD 102 for semantic errors or conflicts. Other validation conditions can relate to checking that a MSPD 102 unambiguously indicates how to adjudicate claims associated with known benefits or services, and/or that plan objects 202 are internally consistent with each other within a particular MSPD 102.

For example, although constraints 404 may provide upper limits for out-of-pocket maximum values during initial entry of user input 402, the constraints 404 may not prevent a user from entering an out-of-pocket maximum for an individual that is higher than a corresponding out-of-pocket maximum for a family. Accordingly, the plan validation and risk analysis tool 502 can be configured to determine whether a draft MSPD 102 has an individual out-of-pocket maximum that is higher than a corresponding family out-of-pocket maximum, and if so indicate that the MSPD 102 is invalid.

As another example, the plan validation and risk analysis tool 502 can loop through a list of any or all known benefits to verify that the MSPD 102 contains a plan object 202 that indicates how to adjudicate claims associated with each benefit, even if the benefit plan defined by the MSPD 102 does not cover that benefit. If the plan validation and risk analysis tool 502 identifies a known benefit that would not correspond to any of the MSPD's plan objects 202, such as any of its cost sharing plan objects 306, the plan validation and risk analysis tool 502 can generate feedback 506 identifying a risk that the MSPD 102 may not indicate how to adjudicate claims associated with that benefit. Similarly, if the plan validation and risk analysis tool 502 identifies a benefit that would correspond to more than one cost sharing plan object 306, such that it is not clear which single cost sharing plan object 306 applies to that benefit, the plan validation and risk analysis tool 502 can generate feedback 506 that indicates that the MSPD 102 may be ambiguous about how to adjudicate claims associated with that benefit.

In some examples, a list of known benefits that the plan validation and risk analysis tool 502 can use to validate that an MSPD 102 unambiguously indicates whether or not all known benefits are covered can be at least partially based on information provided by claim adjudication tools 110 about real claims that have been submitted for adjudication in the past. This can allow MSPDs 102 to be validated against ever increasing numbers of known benefits. For example, if medical providers begin submitting claims for a new type of medical service that is not covered by benefits represented in any plan object 202 of an MSPD 102, the plan validation and risk analysis tool 502 can determine that the MSPD 102 is ambiguous about how to adjudicate claims for that medical service. Accordingly, the plan validation and risk analysis tool 502 can generate feedback 506 so that users can edit the MSPD 102 with the plan authoring tool 104 based on the feedback 506 until the MPSD 102 unambiguously indicates whether or not the benefit plan includes a benefit covering that medical service.

Alternatively, in some examples the plan validation and risk analysis tool 502 can automatically edit an MSPD 102 to include a new plan object 202 associated with a previously unknown benefit, or provide feedback 506 instructing the plan authoring tool 104 to add such a plan object 202 automatically or based on new user input 402. In some cases, the plan validation and risk analysis tool 502 or plan authoring tool 104 can use default values for attributes 204 of a new plan object 202 for the new benefit, such as a code for the associated service provided in the real claims and/or values for attributes 204 inherited from a parent plan object 202.

In some examples, the plan validation and risk analysis tool 502 can also use adjudication results associated with actual past claims received from the claim adjudication tools 110 as data sets for machine learning that can determine risk levels associated with a benefit plan defined by a particular MSPD 102. These machine learning algorithms can improve over time as additional claims adjudication results are received from the claim adjudication tools 110. In some examples, the plan validation and risk analysis tool 502 can compare a determined risk level associated with a benefit plan against a predefined risk tolerance threshold, such that feedback 506 can be generated indicating whether or not the determined risk level is above or below the predefined risk tolerance threshold.

If the plan validation and risk analysis tool 502 outputs feedback 506 indicating that an MSPD 102 did not pass one or more validation conditions or that indicates that risks associated with the benefit plan defined by that MSPD 102 are higher than a predefined risk tolerance threshold, a user can use such feedback 506 to adjust the MSPD 102 with the plan authoring tool 104 until it passes a check against the validation conditions and/or estimated risks associated with the benefit plan are below the predefined risk tolerance threshold. In other examples, the feedback 506 can include recommendations for editing the MSPD 102 that would likely cause the MSPD 102 to pass the validation conditions or lower the determined risk levels. For example, the plan validation and risk analysis tool 502 can recommend changes for the plan authoring tool 104 that would cause the MSPD 102 to become valid or have a risk level that falls below a predefined risk tolerance threshold. In some cases users can review such feedback 506 to edit the MSPD 102 with the plan authoring tool 104, while in other cases the plan authoring tool 104 can automatically edit the MSPD 102 according to the recommendations provided in the feedback 506. As with other types of feedback 506, in some examples recommendations provided in the feedback 506 can be determined by the plan validation and risk analysis tool 502 using machine learning or any other technique.

The plan simulation and analysis tool 504 can perform automatic adjudications of simulated claims based on the MSPD 102. The plan simulation and analysis tool 504 can automatically adjudicate simulated claims using substantially the same processes that the automatic adjudication system 708 discussed below uses to adjudicate real claims. Accordingly, the plan simulation and analysis tool 504 can simulate how real claims would actually be adjudicated in the policy administration system 100 according to the MSPD 102 at a high degree of accuracy. Results of these simulations, including forecasts of a how a benefit plan defined by an MSPD 102 will perform, can be included in feedback 506.

In some examples, the plan simulation and analysis tool 504 can perform its simulations based on simulated claims generated at random or using any other method, without basing the simulated claims on actual claims. However, in other examples the plan simulation and analysis tool 504 can use data provided by the claim adjudication tools 110 about real claims submitted in the past when generating new simulated claims and/or performing the simulations. As one example, the plan simulation and analysis tool 504 can perform simulations that automatically adjudicate real claims submitted in the past according to a newly generated MSPD 102. As another example, the plan simulation and analysis tool 504 can alter parameters of past real claims to generate new simulated claims that can be used in the simulations.

In some examples, the plan simulation and analysis tool 504 can perform simulations associated with a new MSPD 102 being created for a target plan participant or target group of plan participants based on real claims previously submitted for the target plan participant(s) under old policies, and/or based on real claims previously submitted for other plan participants that share one or more characteristics with the target plan participant(s). In some cases, basing the plan simulation and analysis tool's simulation on real claims previously submitted for the same target plan participant(s), and/or other plan participants that share similar characteristics, can allow the simulation to generate more accurate forecasts for the target plan participant(s) relative to simulating claims associated with a larger or more general population. In some examples, the plan simulation and analysis tool 504 can ingest data from one or more external sources to improve its accuracy, such as obtaining demographic or actuarial information about expected groups of plan participants.

In some examples, the plan simulation and analysis tool 504 can also use results of real claim adjudications previously performed by the claim adjudications tools 110 during its simulations. For example, over time the plan simulation and analysis tool 504 can use artificial intelligence and/or machine learning trained on data sets of adjudication results provided by the claim adjudications tools 110 when generating forecasts of cost estimates for a new MSPD 102.

Results of the plan simulation and analysis tool's simulations based on an MSPD 102 can be collected and analyzed to create forecasts that include cost estimates or predictions for how much a benefit plan defined by the MSPD 102 will cost plan participants, a sponsor, and/or an administrator over a given period of time. In some examples, the results of the simulations can also indicate whether one or more groups of simulated plan participants are or are not well covered by the benefit plan defined by the MSPD 102, relative to other benefit plans that are defined by other MSPDs 102 or that are managed or offered by other administrators. For example, simulation results may indicate that a health plan defined by an MSPD 102 provides good coverage for most plan participants, but offers less than average coverage for plan participants with respiratory conditions.

In some examples, the plan simulation and analysis tool 504 can perform simulations for an MSPD 102 based on current regulations and potential changes to current regulations. For example, if a local, state, or federal government is contemplating regulatory changes that may impact administration of a benefit plan, the plan simulation and analysis tool 504 can perform simulations to generate feedback 506 indicating how costs associated with the benefit plan may change if the regulatory changes are adopted.

Forecasts and other results of the plan simulation and analysis tool's simulations based on an MSPD 102 can be included in feedback 506. As such, if simulation results in the feedback 506 indicates that a benefit plan defined by an MSPD 102 does not meet desired goals, such as if it would cost the administrator more than is desired or does not offer a desired coverage level to some or all plan participants, a user can use such user feedback 506 to adjust the MSPD 102 with the plan authoring tool 104 until simulation results from the plan simulation and analysis tool 504 indicates that the benefit plan defined by the MSPD 102 is likely to meet the desired goals. In other examples, the plan simulation and analysis tool 504 can provide feedback 506 to the plan authoring tool 104 with recommendations that the plan authoring tool 104 can implement to automatically edit the MSPD 102. For example, the plan simulation and analysis tool 504 can provide feedback 506 recommending changes for the plan authoring tool 104 that would cause the benefit plan defined by the MSPD 102 to meet predefined goals, such as recommendations for changing attributes 204 of existing plan objects 202 or for creating new plan objects 202. As with other types of feedback 506, in some examples these recommendations can be determined by the plan simulation and analysis tool 504 using machine learning or any other technique.

As noted above, in some examples the plan analysis tools 106 can use information received from the claim adjudication tools 110 about actual claims that have been adjudicated in the past as data sets for machine learning when validating an MSPD 102, determining a risk level associated with one or more benefits of a health plan, when simulating claims adjudication, and and/or generating recommendations within feedback 506. For instance, the plan analysis tools 106 can use regression based on actuarial and/or parametric modeling approaches, or other machine learning based on statistical methods such as kernel-based regression, time-sensitive Markov modeling, neural networks, and/or other machine learning approaches when performing their analyses of an MSPD 102 or a benefit plan defined by the MSPD 102. These machine learning algorithms can improve over time as additional claim information and/or claims adjudication results are received from the claim adjudication tools 110.

For example, the plan analysis tools 106 can use machine learning and/or the other types of analysis described above to generate feedback 506 that identifies which benefits of a benefit plan have the highest costs to a sponsor, which benefits are expected to be used most by plan participants and corresponding cost implications, which types of claims are most often manually adjudicated and which are most often automatically adjudicated, and/or recommended whether coverage stages should be redefined. As another example, machine learning can determine over time which types of claims are likely to be approved or denied, and/or which are likely to contain instances of fraud, waste, or abuse, such that the plan analysis tools 106 can evaluate new or edited MSPDs with that understanding.

Figure 6:
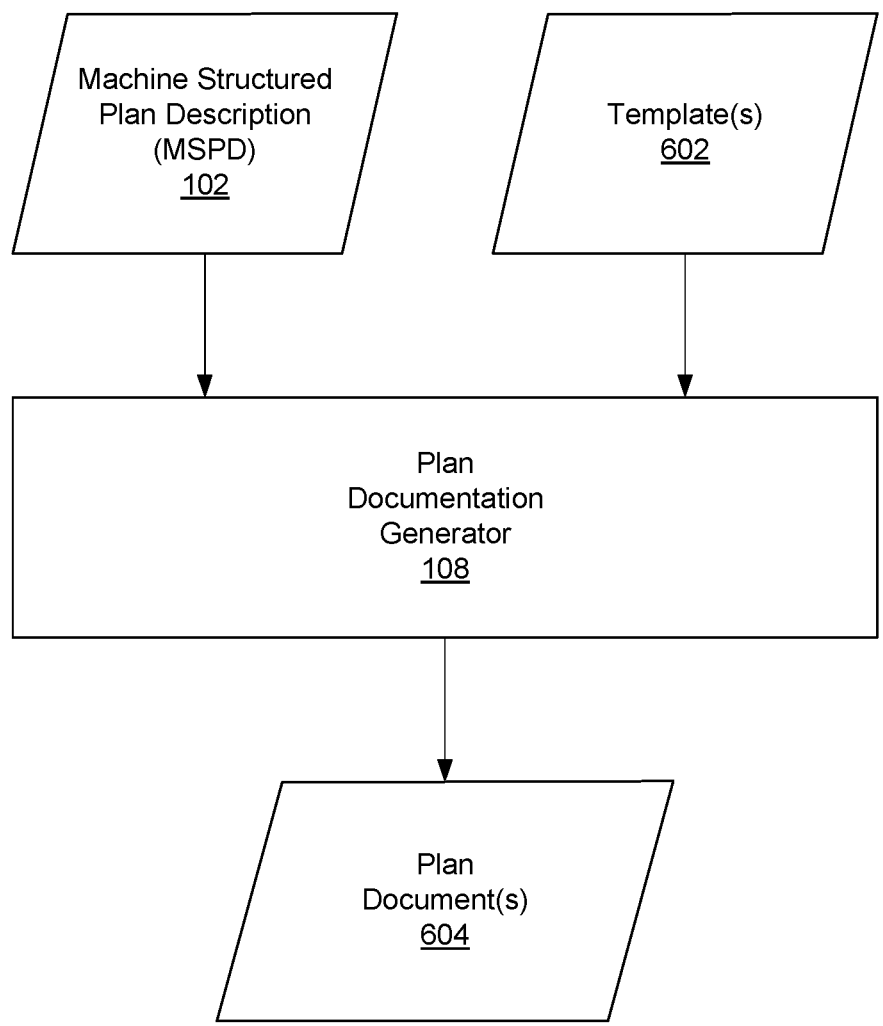
FIG. 6 depicts a plan documentation generator using an MSPD and one or more templates to generate one or more plan documents.

FIG. 6 depicts a plan documentation generator 108 using an MSPD 102 and one or more templates 602 to generate one or more plan documents 604. As explained above, an MSPD 102 can store information about a benefit plan according to a DSL in an object-based data structure such as a serialized arrangement or structured hierarchy of JSON objects, with benefits of the benefit plan being described by various plan objects 202 with one or more attributes 204. However, data in a structured collection of JSON objects or other object-based data structure may not be easily read or understood by human readers. However, the plan documentation generator 108 can be an algorithmic content generation tool that uses a template 602 to convert information from an MSPD 102 into a plan document 604 that can be more easily read and understood by human readers.

A template 602 can include one or more candidate content elements, including predefined candidate sentences for specific benefits that may be provided by a benefit plan, candidate sentences with placeholder fields for variables, and/or other content elements. In some examples, the plan documentation generator 108 can assemble content elements from a template 602 that corresponds to specific plan objects 202 and/or attributes 204 of an MSPD 102 into a plan document 604.

In some examples, the plan documentation generator 108 can also modify or select predefined candidate content elements defined in a template 602, or create its own content elements, as needed to create a plan document 604 using natural language processing. For example, the plan documentation generator 108 can include a structured natural language processing (SNLP) engine and the templates 602 can be SNLP templates. In these examples, the SNLP engine can express selected information from an MSPD 102 using natural language according to an SNLP template. For example, rather than expressing the value of an attribute 204 in a fixed placeholder field, an SNLP template can indicate that the value of the attribute 204 should be expressed using natural language within a sentence, possibly with modifications to sentence structure, verb tense, grammar, word choice, and/or any other modifications in order to cause the resulting sentence to be expressed using natural language and/or to contextually match the style and tone of surrounding content.

Different templates 602 can be provided to generate different types of plan documents 604 for the same and/or different audiences. Some templates 602 can be used to create one or more plan documents 604 for plan participants or potential plan participants of a benefit plan defined by an MSPD 102, while other templates 602 can be used to create one or more plan documents 604 for personnel of a plan sponsor and/or the administrator. For example, when an MSPD 102 defines a health plan, different templates 602 can be provided to generate a summary plan description (SPD), summary of benefits coverage (SBC), content for a plan participant portal website that explain the benefits of the health plan to plan participants, brochures or other advertising materials about the health plan, instructions to administrator personnel for how to manually adjudicate claims from medical providers according to the health plan, or any other type of plan document 604.

As an example, an MSPD 102 for a health plan can include accumulator plan objects 304 and cost sharing plan objects 306 for various services with respect to different coverage states. Accordingly, the plan documentation generator 108 can use a template 602 to generate instructions for administrator personnel about how to adjudicate a claim for a particular service during a particular coverage level, by expressing applicable attributes 204 of corresponding plan objects 202 in natural language for the administrator personnel.

The plan documentation generator 108 can use templates 602 to produce plan documents 604 in one or more file formats. For example, the plan documentation generator 108 can produce one plan document 604 that describes benefits of a benefit plan in HTML code that can be used for a plan participant portal website, as well as another plan document 604 that includes the same information in a digital document file, such as a MICROSOFT® Word file or a PDF file, that can be printed or digitally distributed to plan participants.

In some examples, any of the plan documents 604 produced by the plan documentation generator 108 can also be accessed by a user of the plan authoring tool 104 during creation of a new MSPD 102 or editing of an existing MSPD 102. For example, the user of the plan authoring tool 104 can review plan documents 604 produced for a new MSPD 102 to understand how plan documents 604 will explain the benefit plan defined by that MSPD 102 to other human readers. If desired, the user of the plan authoring tool 104 can make changes to the MSPD 102 in response to how the automatically generated plan documents 604 explain the benefit plan.

In some cases, the plan documentation generator 108 can produce a set of plan documents 604 from a new or updated MSPD 102 more quickly than human authors. For instance, in some examples a plan documentation generator 108 can use an MSPD 102 and templates 602 to create a set of plan documents 604 of many different types in seconds or minutes, while human authors might need days or weeks to create a similar set of plan documents 604. In some examples, the plan documentation generator 108 can also reduce computational resources needed to produce plan documents 604, relative to computational resources needed by human authors over days or weeks to create such plan documents 604.

Additionally, use of the plan documentation generator 108 can decrease the risk of different plan documents 604 containing incorrect or inconsistent information, relative to similar plan documents 604 that might be produced by human authors. For example, there is a risk that human authors may inadvertently include incorrect or inconsistent information in plan documents 604, for instance by introducing typographical errors, explaining plan benefits incorrectly according to mistaken assumptions or interpretations, forgetting to update values to new values when a benefit plan is updated, or mistakenly including inconsistent values for the same benefit in different plan documents 604. However, the plan documentation generator 108 can eliminate or reduce such risks because it generates each plan document 604 for a particular benefit plan from the same underlying information stored in the same MSPD 102. For example, when a copay amount for a particular benefit is updated in an attribute 204 of an MSPD's plan object 202, the plan documentation generator 108 can quickly produce a new set of multiple plan documents 604 for one or more audiences that consistently reflect that new copay amount based on the value of the attribute 204. This can accordingly reduce the time and/or computational resources needed to manually fix inconsistencies and/or verify that various plan documents 604 contain consistent information.

Figure 7:
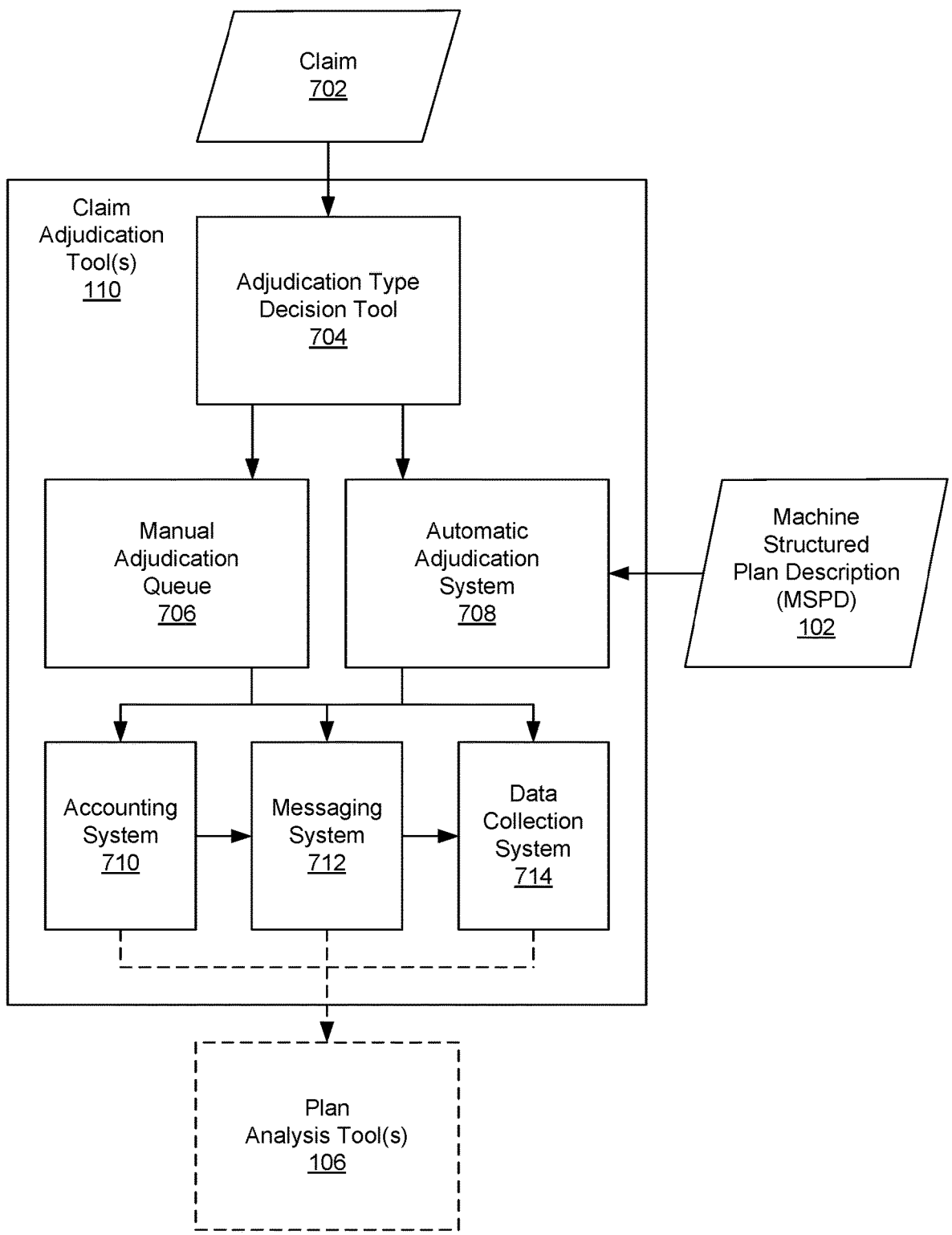
FIG. 7 depicts claim adjudication tools being used to adjudicate a claim.

FIG. 7 depicts claim adjudication tools 110 being used to adjudicate a claim 702. Claim adjudication tools can include an adjudication type decision tool 704, a manual adjudication queue 706, an automatic adjudication system 708, an accounting system 710, a messaging system 712, and a data collection system 714.

In some examples, a claim 702 can be a claim submitted to an administrator of a benefit plan from a provider, such as a claim 702 from a medical provider for the cost of specific medical services rendered to a plan participant of a health plan. In other examples, a claim 702 can be a claim submitted to an administrator of a benefit plan from a plan participant, such as a request for reimbursement for the cost of services that the plan participant paid for out of pocket, a request for the administrator or a sponsor to pay for a service according to a benefit, or a request to apply a payment amount from the plan participant to a service provided according to a benefit. In addition, some claims 702 may be submitted on a regular basis, such as claims 702 submitted weekly, monthly, or annually without respect to actual services being rendered, such as a claims 702 related to a subscription to a health application.

A new claim 702 can first be routed to an adjudication type decision tool 704. The adjudication type decision tool 704 can review one or more attributes of the claim 702 to determine if the claim 702 should be routed into the manual adjudication queue 706 or should be routed into the automatic adjudication system 708. As will be explained below, claims 702 routed to the manual adjudication queue 706 can be manually adjudicated by personnel of the administrator, while claims 702 routed to the automatic adjudication system 708 can be automatically adjudicated based on the MSPD 102. In some examples, the automatic adjudication system 708 can adjudicate a claim 702 more quickly than manual adjudication, thereby reducing the time and computational resources needed to adjudicate a claim 702.

In some examples, the adjudication type decision tool 704 can determine where to route a claim 702 based on one or more predetermined policies or contractual agreements. As one example, an administrator policy or contractual agreement associated with a health plan can indicate that claims 702 associated with certain benefits should be manually reviewed, such as claims 702 for benefits related to child or baby care, investigational care, emergency services, claims 702 for plan participants over the age of 65, or claims 702 for plan participants previously flagged as being high risk. Accordingly, if the adjudication type decision tool 704 determines that a claim 702 meets such a policy, it can route the claim 702 to the manual adjudication queue 706. As another example, an administrator policy can indicate that claims 702 for a dollar value that exceeds a particular threshold should be manually reviewed, and accordingly the adjudication type decision tool 704 can route such claims 702 to the manual adjudication queue 706.

In some examples, the adjudication type decision tool 704 can determine where to route a claim 702 based on artificial intelligence that can recognize claims 702 that have a higher likelihood of being fraudulent, containing errors, or having other issues for which manual adjudication may be preferred to automatic adjudication. For example, service providers may accidentally fill in a claim submission form improperly, and the adjudication type decision tool can accordingly be configured to recognize corresponding errors in the submitted claim. The adjudication type decision tool 704 can be configured to route claims 702 that it determines are be more likely to be fraudulent, contain errors, or have other issues to the manual adjudication queue 706 rather than the automatic adjudication system 708. For example, the adjudication type decision tool 704 can use machine learning to, over time, determine which types of claims 702 are more likely to be fraudulent and should be routed to the manual adjudication queue 706. The operations of the adjudication type decision tool 704 can be based on statistical analysis, multi-armed bandit machine learning, A/B testing, or any other type of artificial intelligence or machine learning, such as statistical regression, Markov modeling, or neural networks.

In one example, machine learning algorithms can be trained based on A/B testing in which claims 702 are routed through both the manual adjudication queue 706 and the automatic adjudication system 708. When the A/B testing reveals that certain types of claims 702 are more likely to be rejected based on manual adjudication relative to automatic adjudication, the machine learning algorithms can be trained to recognize those types of claims 702 as more likely to be fraudulent. The adjudication type decision tool 704 can accordingly route those types of claims 702 to the manual adjudication queue 706 in the future. In some examples, a multi-armed bandit algorithm can be used to route a large percentage of claims 702 to one or the other of the manual adjudication queue 706 and the automatic adjudication system 708 according to previously determined machine learning algorithms, while a smaller percentage of claims 702 are routed to both the manual adjudication queue 706 and the automatic adjudication system 708 for continued training of the machine learning algorithms according to comparisons of manual adjudication results against the automatic adjudication results.

As another example, machine learning algorithms can determine over time which types of claims 702 are relatively common and which are relatively rare, and route rarer types of claims 702 to the manual adjudication queue 708. For instance, the machine learning algorithms can learn over time that claims 702 from medical providers for a single spine injection are relatively common, but claims 702 for fifty spine injections are out of the ordinary and should be routed to the manual adjudication queue 706. In some examples, the machine learning algorithms may also determine over time which plan participants or service providers are most often associated with unusual types of claims 702, and accordingly route their claims 702 to the manual adjudication queue 708.

In some examples, the adjudication type decision tool 704 can determine where to route a claim 702 based on capabilities of the automatic adjudication system 708. For example, adjudication type decision tool 704 can determine if the automatic adjudication system 708 is configured to automatically adjudicate a particular type of claim 702, and if so route that claim 702 to the adjudication type decision tool 704. In some examples, the automatic adjudication system 708 can return any claims 702 it is not configured to handle back to the adjudication type decision tool 704 so that the adjudication type decision tool 704 can update its knowledge of which types of claims the automatic adjudication system 708 is not configured to handle, and the adjudication type decision tool 704 can instead route the claim 702 to the manual adjudication queue 706. In other examples, the automatic adjudication system 708 can directly pass any claims 702 it is not configured to process to the manual adjudication queue 706.

A claim 702 routed to the manual adjudication queue 706 can be manually reviewed and adjudicated by personnel of the administrator, such as a human claim adjudicator. In some examples, the personnel of the administrator can use a plan document 604 generated from an MSPD 102 by the plan documentation generator 108 according to a template 602 when adjudicating the claim 702, because the plan document 604 can describe rules or procedures for adjudicating claims 702 with respect to particular benefits of a benefit plan defined by the MSPD 102.

A claim 702 routed to the automatic adjudication system 708 can be automatically adjudicated based on an MSPD 102. In some examples, the automatic adjudication system 708 can use information about a plan participant, such a subscriber identifier or member number, included in a claim 702 to load an MSPD 102 that defines the benefit plan associated with that plan participant, and then automatically adjudicate the claim 702 according to information in the MSPD 102. As discussed above, an MSPD 102 for a benefit plan can include various plan objects 202 with attributes 204 that define aspects of the benefit plan, including coverage levels for various benefits and services at one or more coverage stages. The automatic adjudication system 708 can accordingly use the information in plan objects 202 that correspond to services identified in a claim 702 to adjudicate the claim 702.

For example, automatic claim adjudication can involve determining if a plan participant is covered by a benefit plan defined by an MSPD 102, whether services identified in the claim 702 are covered by benefits of the benefit plan at a current coverage stage, approving or denying the claim 702, and/or determining which portion of the cost of each service is to be paid by the plan participant and which portion of the cost is to be paid by the sponsor or administrator. An example process for automatically adjudicating a claim 702 with the automatic adjudication system 708 is described below with respect to FIG. 12. As discussed above, the processes described herein for automatically adjudicating real claims 702 with the automatic adjudication system 708 can also be used by the plan simulation and analysis tool 504 to adjudicate simulated claims 702 during its simulations. In some examples, if it is not clear which plan object 202 applies to a particular service identified in a claim 702, the automatic adjudication system 708 can use machine learning to determine which plan object 202 applies to the service. For example, if a claim 702 includes a code for a service that does not correspond to any plan object 202 in the MSPD 102, but manual adjudications in the past that have most often adjudicated claims for that code or service according to a specific benefit that does correspond to a plan object 202 in the MSPD 102, the automatic adjudication system 708 can adjudicate the claim 702 according to that plan object 202 even if the code does not directly match an attribute 204 of that plan object 202. In other examples, when the automatic adjudication system 708 finds a code in a claim 702 that it does not recognize or that does not correspond to a plan object 202, the automatic adjudication system 708 can send the claim 702 to the manual adjudication queue 706 and/or inform the plan analysis tools 106 to update a list of known codes so that a plan validation and analysis tool 502 can determine when new or existing MSPDs 102 do not include plan objects 202 corresponding to the new code.

In some examples, the automatic adjudication system 708 can use a set of preprogrammed computer-executable instructions to automatically interpret and/or compile one or more plan objects 202 of a particular MSPD 102 into a new set of computer-executable instructions that the automatic adjudication system 708 can follow to adjudicate claims 702 according to that MSPD 102. Accordingly, the automatic adjudication system 708 can automatically interpret or compile information from any MSPD 102 into new computer-executable instructions for adjudicating claims 702 according to a corresponding benefit plan, without requiring a programmer to manually reprogram the automatic adjudication system 708 to handle a new or updated benefit plan. This can save time, money, and effort compared to conventional automatic adjudication systems.

Figure 8:
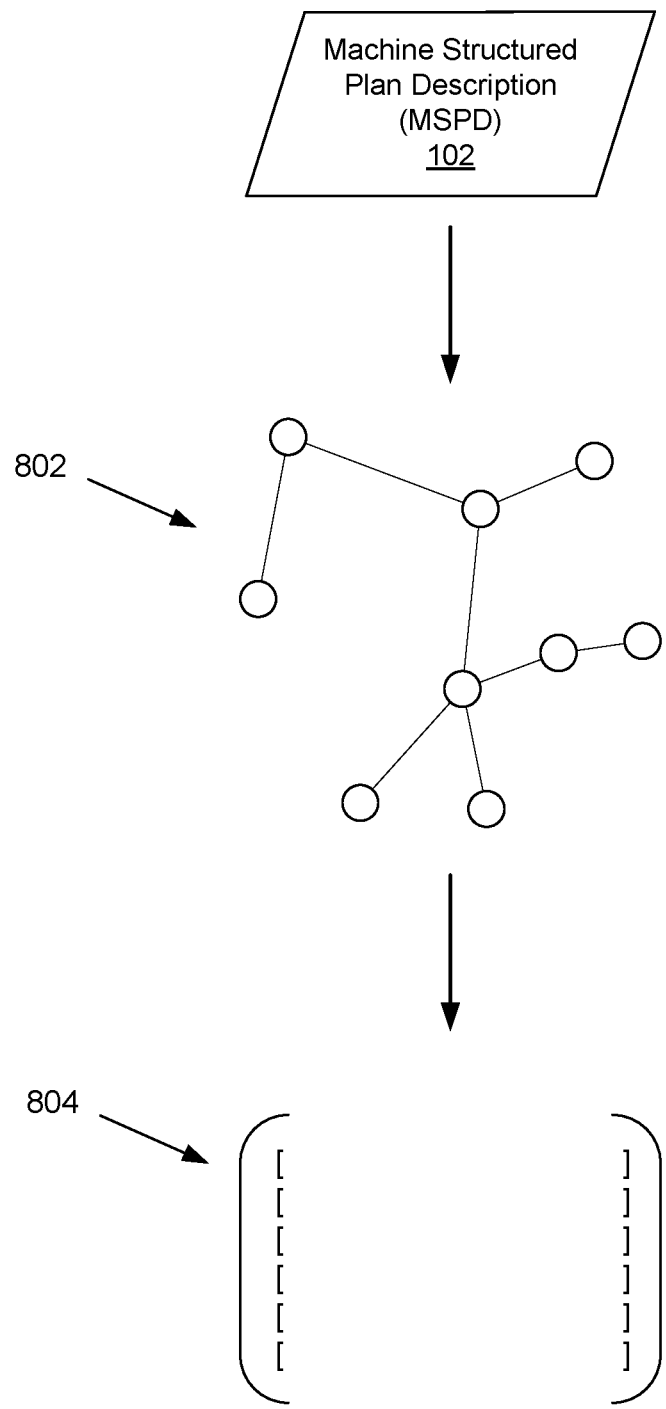
FIG. 8 depicts interpretation of an MSPD into a list of computer-readable instructions by an automatic adjudication system.

For example, as shown in FIG. 8, the automatic adjudication system 708 can use preset code to identify relationships between plan objects 202 within an MSPD 102, such as relationships between a cost sharing plan object 306 for a particular service and related accumulator plan objects 304 identified by that cost sharing plan object 306. The automatic adjudication system 708 can generate a parse graph 802 based on the MSPD 102 with nodes representing plan objects 202 and arcs between the nodes representing relationships between the plan objects 202. The automatic adjudication system 708 can then use the parse graph 802 to generate a list 804 of computer-executable instructions in Python or any other desired programming language, or compiled code, that can be run to automatically adjudicate a claim 702. For example, a parse graph 802 generated from an MSPD 102 can indicate relationships between a cost sharing plan object 306 and multiple accumulator plan objects 304 that indicate that the cost of a particular rendered service should be applied to accumulators for an individual deductible, to a family deductible, and towards individual and/or family out-of-pocket maximums. The automatic adjudication system 708 can accordingly generate a list 804 of computer-executable instructions, or compiled code, that applies a plan participant's share of the cost to those identified accumulators during automatic claim adjudication.

In some examples, the determination by the automatic adjudication system 708 of whether a claim 702 is approved or rejected, and any cost sharing determinations applicable to the claim 702, can be considered final, and can be output to the accounting system 710, messaging system 712, and/or data collection system 714 as discussed below. However, in other examples some or all results of the automatic adjudication system 708 can be sent to the manual adjudication queue 706 to be approved or double checked by human reviewers before they are finalized.

If manual adjudication, or the automatic adjudication system 708, determines that a plan participant and/or the sponsor or administrator is liable for portions of the cost of a service identified in a claim 702 according to a particular benefit, the results of the adjudication can be passed to the accounting system 710. The accounting system 710 can generate bills for the plan participant, track whether bills have been paid, can pay providers who submitted claims, and/or perform any other billing or accounting operation.

The messaging system 712 can send messages to recipients outside the plan administration system 100. In some examples, the messaging system 712 can send messages to plan participants, such as messages that include bills generated by the accounting system 710 or messages that indicate whether claims 702 have been approved or denied. In other examples, the messaging system 712 can send messages to a provider who submitted a claim 702, such as a message indicating that a claim 702 has been approved or denied, or that more information is needed from the provider before a claim 702 can be adjudicated.

The data collection system 714 can collect results of the manual or automatic adjudication of claims 702, as well as information from the accounting system 710 and/or messaging system 712 regarding how claims 702 have been processed. These collected results can be stored for later analysis. In some examples, the data collection system 714 can send collected results to the plan analysis tools 106 for use as a data set when validating new or edited MSPDs 102 or when simulating the performance of new or edited MSPDs 102, as described above.

Example Architecture

Figure 9:
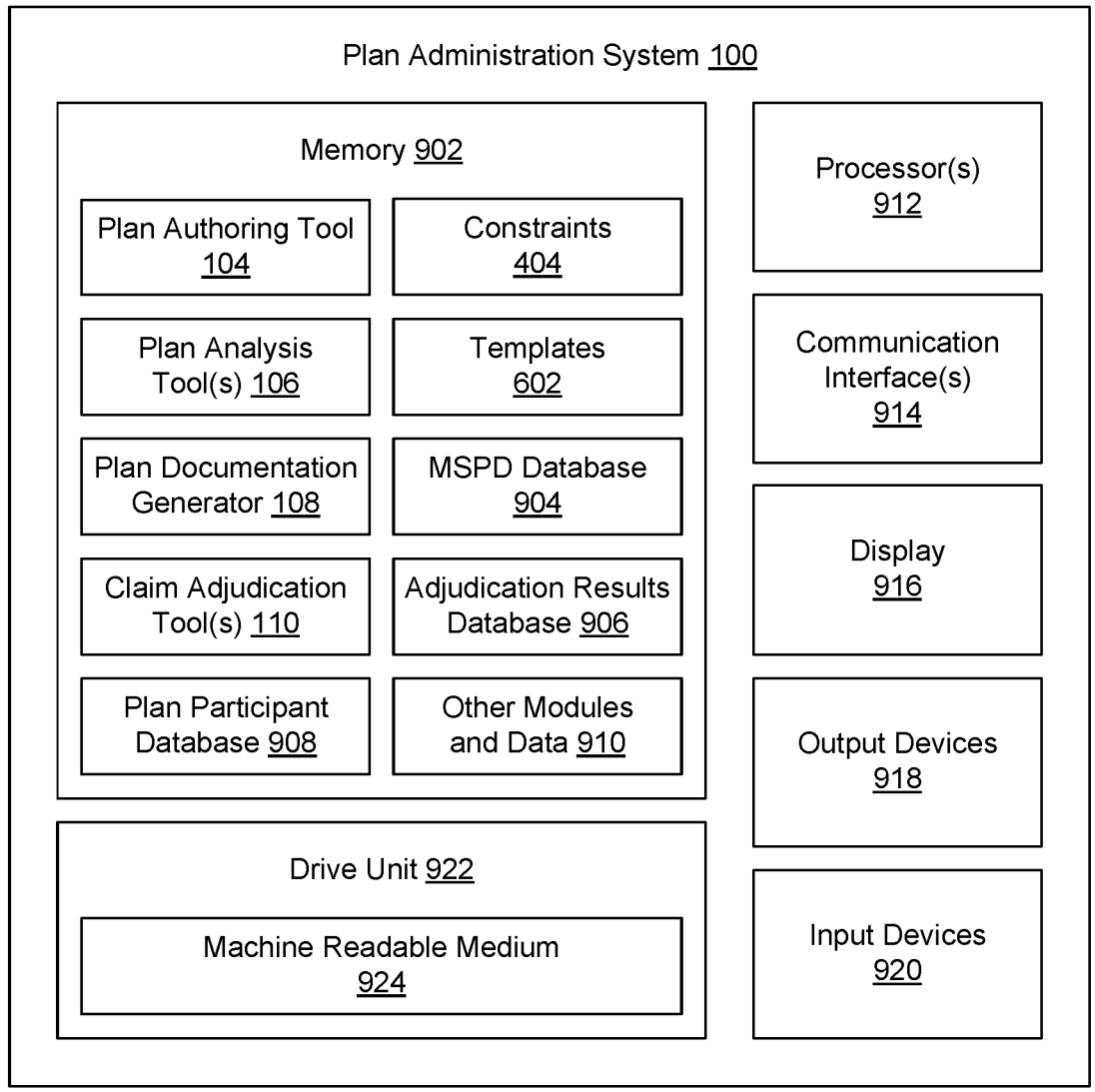
FIG. 9 illustrates an example system architecture for computing devices that can implement a plan administration system.

FIG. 9 illustrates an example system architecture for computing devices that can implement a plan administration system 100. Although FIG. 9 depicts elements of a plan administration system 100 together, in some examples the elements shown in FIG. 9 can be distributed among multiple computing devices, such as multiple servers. As shown, one or more computing devices for a plan administration system 100 can include memory 902 that stores the plan authoring tool 104, the plan analysis tools 106, the plan documentation generator 108, the claim adjudication tools 110, constraints 404, templates 602, an MSPD database 904, an adjudication results database 906, a plan participant database 908, and/or other modules and data 910. The one or more computing devices can also include processor(s) 912, communication interfaces 914, displays 916, output devices 918, input devices 920, and/or drive units 922 that include a machine readable medium 924.

In various examples, memory 902 can include system memory, which may be volatile (such as RAM), non-volatile (such as ROM, flash memory, etc.) or some combination of the two. Memory 902 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store desired information and which can be accessed by the plan administration system 100. Any such non-transitory computer-readable media may be part of the plan administration system 100.

Memory 902 of one or more computing devices of the plan administration system 100 can store code, such as computer-executable instructions, for the plan authoring tool 104, the plan analysis tools 106, the plan documentation generator 108, and the claim adjudication tools 110 described above. In some examples, the memory 902 can also store rules and/or machine learning models used by the plan analysis tools 106, the plan documentation generator 108, the claim adjudication tools 110, or any other element of the plan administration system 100, as well as constraints 404 used by the plan authoring tool 104, templates 602 used by the plan documentation generator 108. The memory 902 can also store an MSPD database 904 that can store MSPDs 102 generated by the plan authoring tool 104, an adjudication results database 906 that can store collected results of claims adjudications, and a plan participant database 908 that can use identifying information about plan participants to identify which benefit plans and/or MSPDs 102 are associated with specific plan participants as well as tracking accumulators associated with individual plan participants throughout the term of a benefit plan. The memory can further store other modules and data 910 that can be used to perform or enable performing any other action taken by the plan administration system 100. The other modules and data 910 can include a platform and applications associated with the plan administration system 100, and data utilized by the platform and applications.

In various examples, the processor(s) 912 can be a central processing unit (CPU), a graphics processing unit (GPU), or both CPU and GPU, or any other type of processing unit. Each of the one or more processor(s) 912 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 912 may also be responsible for executing all computer applications stored in the memory 902, which can be associated with common types of volatile (RAM) and/or nonvolatile (ROM) memory.

The communication interfaces 914 can include transceivers, modems, interfaces, and/or other components that perform or assist in exchanging data between elements of the plan administration system 100 and/or with outside elements. For example, the communication interfaces 914 can be used to receive claims 702 from providers and/or to send messages from the messaging system 712 to providers or plan participants.

A display 916 can be a liquid crystal display or any other type of display used in computing devices, or a connection to an external display. In some examples, a display 916 can be a touch-sensitive display screen, and can accordingly also act as an input device 920.

Output devices 918 can include any sort of output devices known in the art, such as a display 916 or speakers. Output devices 918 can also include ports for one or more peripheral devices, such as headphones, peripheral speakers, and/or a peripheral display.

Input devices 920 can include any sort of input devices known in the art, such as a microphone, a keyboard, and/or a touch-sensitive display, such as the touch-sensitive display screen described above.

The machine readable medium 924 can store one or more sets of instructions, such as software or firmware, that embodies any one or more of the methodologies or functions described herein. The instructions can also reside, completely or at least partially, within the memory 902, processor(s) 912, and/or communication interface(s) 914 during execution thereof by the plan administration system 100. The memory 902 and the processor(s) 912 can also constitute machine readable media 924.

Example Operations

Figure 10:
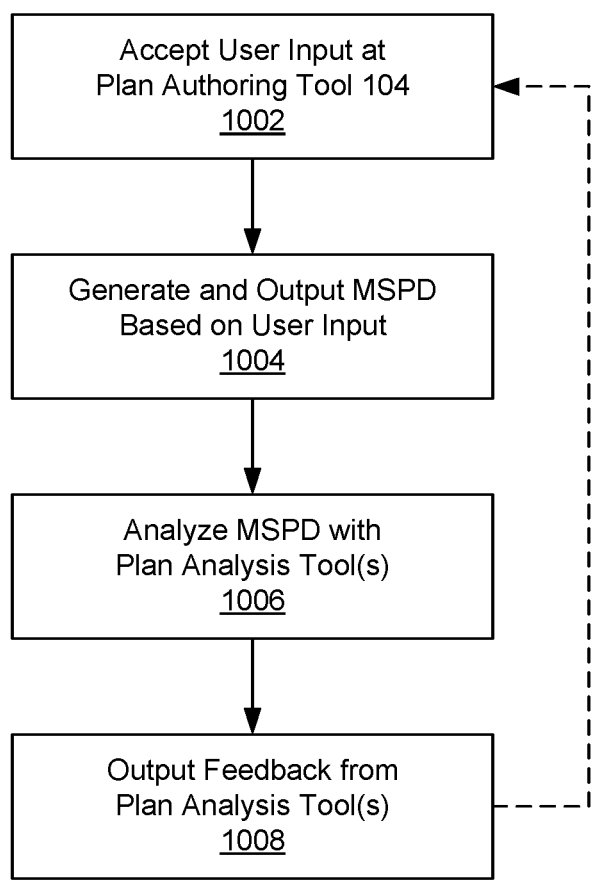
FIG. 10 depicts a flow chart of an example process for creating and/or editing a benefit plan defined by an MSPD.

FIG. 10 depicts a flow chart of an example process for creating and/or editing a benefit plan defined by an MSPD 102.

At block 1002, the plan authoring tool 104 can accept user input 402 from a user regarding parameters of a benefit plan. As described above, the UI can present predetermined options for such user input 402, and/or allow users to manually input information or adjust the predetermined options. In some examples, constraints 404 can restrict or limit the types or values of provided user input 402.

At block 1004, the plan authoring tool 104 can generate and output an MSPD 102 that defines the benefit plan. As described above, an MSPD 102 can include plan objects 202 and attributes 204 that define the benefit plan. In some examples, the plan authoring tool 104 can use a schema stack to translate the provided user input 402 and/or any other information, into an MSPD 102 according to a DSL. An output MSPD 102 can be stored in an MSPD database 704 or other memory location.

At block 1006, the plan analysis tools 106 can operate on the MSPD 102 to validate the benefit plan, determine risk levels associated with the benefit plan, simulate performance of the benefit plan, generate recommendations for how to improve aspects of the benefit plan, or any other type of analysis.

At block 1008, feedback 506 generated from the analysis performed by the plan analysis tools 106 during block 1006 can be provided to a user or a component of the plan administration system 100. In some examples, the user can review that feedback 506, instruct the plan authoring tool 104 to load the MSPD 102, and then edit the benefit plan via new user input to the plan authoring tool 104 in order to adjust the attributes 204 of the MSPD 102 according to the feedback 506. The edited MSPD 102 can be generated and stored at block 1004 and analyzed again at block 1006. The user can review new feedback 506 provided at block 1008 and determine whether to make further changes to the benefit plan at block 1002. Alternately, or additionally, the plan analysis tools 106 can suggest modifications to an MSPD 102 within feedback 506 provided directly to the plan authoring tool 104, which the plan authoring tool 104 can implement so that the MSPD 102 and the benefit plan it defines meets predefined goals.

Figure 11:
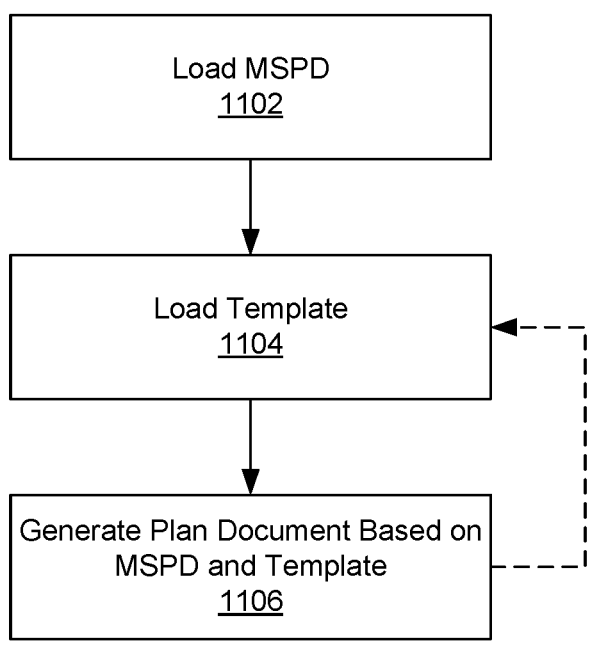
FIG. 11 depicts a flow chart of an example process for generating plan documents with the plan documentation generator based on an MSPD.

FIG. 11 depicts a flow chart of an example process for generating plan documents with the plan documentation generator 108 based on an MSPD 102.

At block 1102, an MSPD 102 can be loaded from a memory location into the plan documentation generator 108.

At block 1104, a template 602 can be loaded from a memory location into the plan documentation generator 108.

At block 1106, the plan documentation generator 108 can generate a plan document 604 that expresses information about the benefit plan defined by the MSPD 102 according to the template 602. For example, the plan documentation generator 108 can use the template 602 to express selected types of information from the MSPD 102 in natural language that can be more easily read or understood by a human reader relative to reading the MSPD 102.

If other templates 602 exist for other types of plan documents 604, the plan documentation generator 108 can return to block 1104 and load a different template 602 in order to generate a different plan document 604 based on the same MSPD 102. Accordingly, the plan documentation generator 108 can generate multiple plan documents 604 of different types or for different audiences from the same MSPD 102 using different templates 602.

Figure 12:
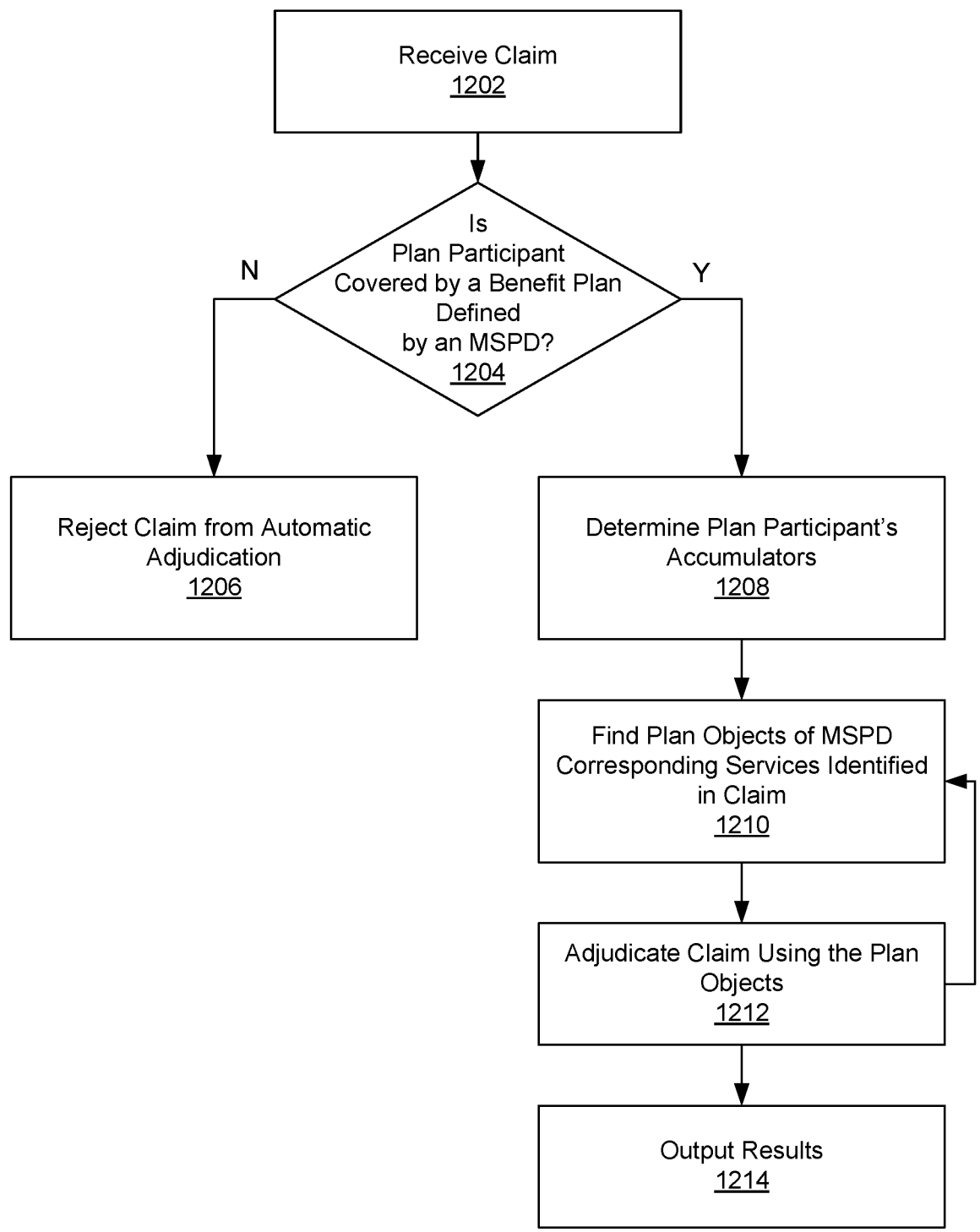
FIG. 12 depicts a flow chart of an example process for automatically adjudicating a claim with the automatic adjudication system.

FIG. 12 depicts a flow chart of an example process for automatically adjudicating a claim 702 with the automatic adjudication system 708.

At block 1202, the automatic adjudication system 708 can receive a claim 702 from a provider or other source. The claim 702 can identify the plan participant for which the claim 702 is being submitted, as well as identifying one or more services and those cost of those services. In some examples, a claim 702 can identify bundles of services or episodes of care rather than identifying each individual rendered service. For example, a medical provider can include information in a claim 702 that identifies a plan participant by name and/or by an identification number, such as a social security number, member number, or insurance policy number, and codes or other identifiers of medical services or episodes of care that the medical provider rendered to the plan participant.

At block 1204, the automatic adjudication system 708 can determine if the plan participant identified in the claim 702 is covered by a benefit plan defined by an MSPD 102 that is administered by the administrator. For example, the automatic adjudication system 708 can look up a member number or plan participant name specified in a claim 702 within a plan participant database 908 in an attempt to identify a corresponding MSPD 102. If the automatic adjudication system 708 can cannot find an MSPD 102 associated with the plan participant at block 1204, the automatic adjudication system 708 can reject the claim from automatic adjudication at block 1206, such as by rejecting the claim 702 entirely, passing it to the manual adjudication queue 706, or sending a message to the entity that submitted the claim 702 or the administrator via the messaging system 712 indicating that plan participant or benefit plan could not be found. However, if the automatic adjudication system 708 can find an MSPD 102 associated with the plan participant at block 1204, the automatic adjudication system 708 can retrieve that MSPD 102 from a database or other memory location and proceed to block 1208.

At block 1208, the automatic adjudication system 708 can use information in a plan participant database 908 to look up current values for accumulators associated with the plan participant, such as how close the plan participant is to meeting various deductibles and/or out-of-pocket maximums for the current term of a health plan. The retrieved accumulator values can be used to determine a current coverage stage, such as determining that the plan participant is at a coverage stage in which the plan participant is only liable for a coinsurance percentage of the cost of certain services because the plan participant's share of costs have passed a deductible amount but have not yet reached an out-of-pocket maximum. In other examples, the automatic adjudication system 708 may not explicitly determine the plan participant's current coverage stage and may adjudicate a claim 702 with respect to all possible coverage stages based on current accumulator values, but use accumulator limits in accumulator plan objects 208 can indicate that cost sharing parameters applicable to certain coverage stages should or should not be applied.

At block 1210, the automatic adjudication system 708 can find plan objects 202 in the MSPD 102 that corresponds to the services or episodes of care identified in the claim 702. For example, a claim 702 for a doctor's office visit may include codes identifying that three services were rendered during the doctor's office visit, and the automatic adjudication system 708 can find a cost sharing plan object 306 associated with each of those service codes. In some examples, multiple service instances that relate to the same service covered by the same benefit can be grouped together for adjudication. As described above, in some examples machine learning can be used to determine which plan object 202 applies to a service if it is not otherwise clear which plan object 202 applies to that service.

At block 1212, for each identified service or episode of care, the automatic adjudication system 708 can use the attributes 204 of the corresponding plan object 202 to adjudicate the claim 702 with respect to that service. Adjudicating the claim 702 can include determining whether the benefit plan defined by the MSPD 102 includes a cost sharing object 306 that covers that service, what portions of the provider's cost the plan participant is liable for and the benefit plan's administrator is liable for, whether any accumulators for the plan participant should be incremented based on a plan participant's share of the cost up to limits defined in corresponding accumulator plan objects 304, and/or any other information. In some examples, the automatic adjudication system 708 can evaluate a claim 702 at all possible coverage stages that may or may not apply, such as determining that cost sharing parameters associated with a first coverage stage do not apply because the plan participant has reached a first accumulator limit, applying cost sharing parameters associated with a second coverage stage for a first portion of the cost up until a second accumulator limit is reached, and then applying cost sharing parameters associated with a third coverage stage for the remainder of the cost.

As an example, when a claim 702 includes a code for a non-preventative office visit, and a corresponding cost sharing plan object 306 has an attribute 204 indicating that the plan participant is liable for a $20 copay for such a non-preventative office visit at a particular coverage stage, the automatic adjudication system 708 can approve the claim and determine that the plan participant is liable for $20 and that the health plan will cover the remainder of the cost of the office visit. The automatic adjudication system 708 increment one or more corresponding accumulators for the plan participant by $20 in the plan participant database 908. If the plan participant's share of the cost is more than a value that would cause an accumulator to reach a limit, the cost up until that limit can be evaluated under a first set of cost sharing attributes 204 associated with one coverage stage, with the remainder of the cost being evaluated under a second set of cost sharing attributes 204 associated with a subsequent coverage stage.

As another example, when a claim 702 includes a code for bariatric surgery, but a corresponding cost sharing plan object 306 has an attribute 202 indicating that the benefit plan does not cover bariatric surgery, the claim 702 can be rejected by the automatic adjudication system 708.

In some examples, during adjudication at block 1212 the automatic adjudication system 708 can determine the coverage stage of the plan participant at the time a service was rendered. For example, a plan object 202 may have attributes 204 indicate that there is one value for a copay amount related to a service at a coverage stage when the plan participant has not yet paid the full value of an annual deductible, but a lower value for that same copay amount after the plan participant has paid the full annual deductible amount. Accordingly, the automatic adjudication system 708 can track or determine the coverage stage of a plan participant to determine which corresponding attribute 204 should be used when adjudicating a claim 702 for that plan participant.

After block 1212, if any additional services were identified in the claim 702, the automatic adjudication system 708 can return to block 1210 to find a plan object 202 associated with that service and adjudicate the claim 702 with respect to that service at block 1212.

At block 1214, the automatic adjudication system 708 can output the results of its adjudication of the claim 702 to other elements of the claims adjudication tools 110, such as the accounting system 710, the messaging system 712, and/or the data collection system 714.

Example Clauses

A. A computer-implemented method comprising: receiving user input at a plan authoring tool, the user input describing one or more parameters of one or more benefits of a benefit plan; translating, by the plan authoring tool, the user input into a machine structured plan description (MSPD) that represents the one or more benefits as plan objects of the MSPD; loading the MSPD and a template into a plan documentation generator, the template corresponding to a document type and a document format; and generating, by the plan documentation generator, a plan document associated with the benefit plan by converting information in one or more of the plan objects into natural language according to the template.

B. The computer-implemented method as paragraph A recites, wherein the template is configured such that the plan document is generated as content that explains the one or more benefits to a plan participant of the benefit plan or a potential plan participant.

C. The computer-implemented method as paragraph B recites, wherein the content is electronic content for a website for the plan participant or the potential plan participant.

D. The computer-implemented method as paragraph B recites, wherein the content is generated in a printable form for printing and physical distribution to the plan participant or the potential plan participant.

E. The computer-implemented method as any of paragraphs A-D recite, wherein the template is configured such that the plan document is generated as a set of claims adjudication rules that instruct a claims administrator how to manually adjudicate a submitted claim according to the benefit plan defined by the MSPD.

F. The computer-implemented method as any of paragraphs A-E recite, further comprising generating feedback regarding the benefit plan defined by the MSPD prior to generating the plan document.

G. The computer-implemented method as paragraph F recites, wherein the feedback is based on determining whether the MSPD meets one or more validation conditions.

H. The computer-implemented method as paragraph F recites, wherein the feedback is based on outcomes of simulations that automatically adjudicate simulated claims according to the MSPD.

I. The computer-implemented method as paragraph H recites, wherein the simulated claims are generated at least in part on real claims that have been adjudicated in the past.

J. The computer-implemented method as paragraph F recites, further comprising displaying the feedback to a user of the plan authoring tool, receiving additional user input at the plan authoring tool in response to the feedback, and editing the MSPD according to the additional user input.

K. The computer-implemented method as paragraph F recites, further comprising automatically editing the MSPD at the plan authoring tool according to the feedback.

L. The computer-implemented method as paragraph F recites, wherein the feedback includes recommendations for editing the MSPD that are generated based at least in part on machine learning.

M. A plan administration system comprising: a plan authoring tool that accepts user input describing one or more parameters of one or more benefits of a benefit plan and translates the user input into a machine structured plan description (MSPD) that represents the one or more benefits as plan objects of the MSPD; and a plan documentation generator that uses a template corresponding to a document type and a document format to generate a plan document associated with the benefit plan by converting information in one or more of the plan objects of the MSPD into natural language according to the template.

N. The plan administration system as paragraph M recites, wherein the template is configured such that the plan document is generated as content that explains the one or more benefits to a plan participant of the benefit plan or a potential plan participant.

O. The plan administration system as any paragraphs M or N recite, wherein the template is configured such that the plan document is generated as a set of claims adjudication rules that instruct a claims administrator how to manually adjudicate a submitted claim according to the benefit plan defined by the MSPD.

P. The plan administration system as any paragraphs M-O recite, further comprising one or more plan analysis tools configured to generate feedback regarding the benefit plan defined by the MSPD prior to generating the plan document based on at least one of 1) whether the MSPD meets one or more validation condition, and 2) outcomes of simulations that automatically adjudicate simulated claims according to the MSPD.

Q. One or more non-transitory computer-readable media storing computer-executable instructions that, when executed by one or more processors, cause the one or more processors to perform operations comprising: receiving user input describing one or more parameters of one or more benefits of a benefit plan; translating the user input into a machine structured plan description (MSPD) that represents the one or more benefits as plan objects of the MSPD; loading a template corresponding to a document type and a document format; and generating a plan document associated with the benefit plan by converting information in one or more of the plan objects into natural language according to the template.

R. The non-transitory computer-readable media as paragraph Q recites, wherein the operations further comprise generating feedback regarding the benefit plan defined by the MSPD prior to generating the plan document.

S. The non-transitory computer-readable media as paragraph R recites, wherein the feedback is based on determining whether the MSPD meets one or more validation conditions.

T. The non-transitory computer-readable media as paragraph R recites, wherein the feedback is based on outcomes of simulations that automatically adjudicate simulated claims according to the MSPD.

U. A computer-implemented method comprising: receiving user input at a plan authoring tool, the user input describing one or more parameters of one or more benefits of a benefit plan; translating, by the plan authoring tool, the user input into a machine structured plan description (MSPD) that represents the one or more benefits as plan objects of the MSPD; receiving a claim submitted by an entity, the claim identifying a service rendered for a plan participant covered by the benefit plan; determining that the claim qualifies for automatic adjudication by an automatic claim adjudication system; finding, by the automatic claim adjudication system, a plan object of the MSPD that corresponds to the service; determining, by the automatic claim adjudication system, that the plan object indicates that the benefit plan covers at least a portion of a cost of the service; calculating, by the automatic claim adjudication system, a first portion of the cost for which the plan participant is liable and a second portion of the cost for which a non-participant entity is liable; and outputting, by the automatic claim adjudication system, a result indicating at least one of the first portion of the cost or the second portion of the cost.

V. The computer-implemented method as paragraph U recites, wherein the non-participant entity is a sponsor of the benefit plan or an administrator that operates the plan authoring tool and the automatic claim adjudication system.

W. The computer-implemented method as any of paragraphs U or V recite, further aggregating the result with other results of other automatic and/or manual claim adjudications to generate an aggregated result, and providing the aggregated result to one or more plan analysis tools.

X. The computer-implemented method as paragraph W recites, wherein the one or more plan analysis tools are configured to use the aggregated result to evaluate new MSPDs generated by the plan authoring tool.

Y. The computer-implemented method as any of paragraphs U-X recite, wherein the automatic claim adjudication system calculates the first portion of the cost and the second portion of the cost by determining one or more accumulator values associated with the plan participant and applying cost sharing attributes of the plan object that are applicable to corresponding coverage stages.

Z. The computer-implemented method as any of paragraphs U-Y recite, wherein determining that the claim qualifies for automatic adjudication by the automatic claim adjudication system comprises determining that the claim is for an amount that is less than a threshold amount.

AA. The computer-implemented method as any of paragraphs U-Z recite, wherein determining that the claim qualifies for automatic adjudication by the automatic claim adjudication system comprises determining that the service or the plan participant has not been flagged for manual adjudication.

BB. The computer-implemented method as any of paragraphs U-AA recite, wherein determining that the claim qualifies for automatic adjudication by the automatic claim adjudication system comprises using machine learning to determine that automatic adjudication is likely to produce the same result as manual adjudication.

CC. The computer-implemented method as paragraph BB recites, wherein the machine learning is based on adjudication results of previous claims associated with the type of the service and determines that the claim qualifies for automatic adjudication when at least a threshold percentage of manual adjudications and automatic adjudications of the previous claims produced the same result.

DD. The computer-implemented method as any of paragraphs U-CC recite, wherein information in the MSPD is expressed using a domain-specific language.

EE. The computer-implemented method as any of paragraphs U-DD recite, wherein the automatic claim adjudication system interprets the MSPD using a parse graph to generate a list of instructions for automatically adjudicating the claim according to the benefit plan.

FF. A plan administration system comprising: a plan authoring tool that accepts user input describing one or more parameters of one or more benefits of a benefit plan and translates the user input into a machine structured plan description (MSPD) that represents the one or more benefits as plan objects of the MSPD; and a claim adjudication system configured to: receive a claim submitted by an entity, the claim identifying a service rendered for a plan participant covered by the benefit plan; determine that the claim qualifies for automatic adjudication; find a plan object of the MSPD that corresponds to the service; determine that the plan object indicates that the benefit plan covers at least a portion of a cost of the service; calculate a first portion of the cost for which the plan participant is liable and a second portion of the cost for which a non-participant entity is liable; and output a result indicating at least one of the first portion of the cost or the second portion of the cost.

GG. The plan administration system as paragraph FF recites, wherein the automatic claim adjudication system calculates the first portion of the cost and the second portion of the cost by determining one or more accumulator values associated with the plan participant and applying cost sharing attributes of the plan object that are applicable to corresponding coverage stages.

HH. The plan administration system as any of paragraphs FF or GG recite, wherein determining that the claim qualifies for automatic adjudication by the automatic claim adjudication system comprises at least one of: 1) determining that the claim is for an amount that is less than a threshold amount, 2) determining that the service or the plan participant has not been flagged for manual adjudication, or 3) using machine learning to determine that automatic adjudication is likely to produce the same result as manual adjudication.

II. The plan administration system as any of paragraphs FF-HH recite, wherein information in the MSPD is expressed using a domain-specific language.

JJ. The plan administration system as any of paragraphs FF-II recite, wherein the automatic claim adjudication system interprets the MSPD using a parse graph to generate a list of instructions for automatically adjudicating the claim according to the benefit plan.

KK. One or more non-transitory computer-readable media storing computer-executable instructions that, when executed by one or more processors, cause the one or more processors to perform operations comprising: receiving user input describing one or more parameters of one or more benefits of a benefit plan; translating the user input into a machine structured plan description (MSPD) that represents the one or more benefits as plan objects of the MSPD; receiving a claim submitted by an entity, the claim identifying a service rendered for a plan participant covered by the benefit plan; determining that the claim qualifies for automatic adjudication; finding a plan object of the MSPD that corresponds to the service; determining that the plan object indicates that the benefit plan covers at least a portion of a cost of the service; calculating a first portion of the cost for which the plan participant is liable and a second portion of the cost for which a non-participant entity is liable; and outputting a result indicating at least one of the first portion of the cost or the second portion of the cost.

LL. The non-transitory computer-readable media as paragraph KK recites, wherein the first portion of the cost and the second portion of the cost are calculated by determining one or more accumulator values associated with the plan participant and applying cost sharing attributes of the plan object that are applicable to corresponding coverage stages.

MM. The non-transitory computer-readable media as any of paragraphs KK or LL recite, wherein determining that the claim qualifies for automatic adjudication comprises at least one of: 1) determining that the claim is for an amount that is less than a threshold amount, 2) determining that the service or the plan participant has not been flagged for manual adjudication, or 3) using machine learning to determine that automatic adjudication is likely to produce the same result as manual adjudication.

NN. The non-transitory computer-readable media as any of paragraphs KK-MM recite, wherein calculating the first portion of the cost and the second portion of the cost comprises interpreting the MSPD using a parse graph to generate a list of instructions for automatically adjudicating the claim according to the benefit plan and calculating the first portion of the cost and the second portion of the cost using the list of instructions.

While paragraphs A-L and U-EE are described above with respect to methods, it is understood in the context of this document that the content of paragraphs A-L and U-EE may also be implemented via systems, devices, and/or computer-readable media. While paragraphs M-P and FF-JJ are described above with respect to systems, it is understood in the context of this document that the content of paragraphs M-P and FF-JJ may also be implemented via methods, devices, and/or computer-readable media. While paragraphs Q-T and KK-NN are described above with respect to computer-readable media, it is understood in the context of this document that the content of paragraphs Q-T and KK-NN may also be implemented via methods, systems, and/or devices.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method comprising:
receiving, by a plan authoring tool executing via one or more computing devices, user input describing one or more parameters of one or more benefits of a draft benefit plan;
translating, by the plan authoring tool, the user input into a draft machine structured plan description (MSPD) that defines the draft benefit plan and represents the one or more benefits as plan objects of the draft MSPD;
generating, by one or more plan analysis tools executing via the one or more computing devices, feedback associated with the draft benefit plan based on at least one of:
validating that the draft benefit plan, defined by the draft MSPD, satisfies one or more validation conditions, or simulating automatic adjudication of sample claims, based on the draft MSPD, via an automatic claim adjudication system executing via the one or more computing devices;
approving, based on the feedback:
the draft benefit plan as a final benefit plan, and
the draft MSPD as a final MSPD that defines the final benefit plan; and
providing the final MSPD to at least one of:
a plan documentation generator, executing via the one or more computing devices, configured to automatically generate one or more plan documents based on the final MSPD, or
the automatic claim adjudication system, wherein the automatic claim adjudication system is configured to use the final MSPD to automatically adjudicate claims submitted in association with the final benefit plan.

2. The computer-implemented method of claim 1, wherein the draft MSPD is an object-based data structure comprising the plan objects, and the plan objects express the one or more parameters of the one or more benefits via a domain-specific language.

3. The computer-implemented method of claim 1, wherein the user input is received via a user interface of the plan authoring tool, and the user interface is configured with one or more constraints that define allowable values of the one or more parameters.

4. The computer-implemented method of claim 1, further comprising displaying the feedback via a user interface of the plan authoring tool.

5. The computer-implemented method of claim 1, wherein the feedback includes at least one revision recommendation associated with one or more adjustments to at least one of the one or more parameters of the one or more benefits of the draft benefit plan.

6. The computer-implemented method of claim 5, further comprising:
automatically updating, by the plan authoring tool, the draft MSPD based on the at least one revision recommendation,
wherein the draft benefit plan is approved as the final benefit plan, and the draft MSPD is approved as the final benefit plan, at least in part in response to automatically updating the draft MSPD based on the at least one revision recommendation.

7. The computer-implemented method of claim 1, further comprising:
receiving, by the plan authoring tool, second user input in response to the feedback, wherein the second user input adjusts at least one of the one or more parameters of the one or more benefits of the draft benefit plan;
updating, by the plan authoring tool, the draft MSPD based on the second user input; and
updating, by the one or more plan analysis tools, the feedback based on the updating of the draft MSPD,
wherein the draft benefit plan is approved as the final benefit plan, and the draft MSPD is approved as the final benefit plan, based at least in part on the updating of the feedback.

8. The computer-implemented method of claim 1, wherein validating that the draft benefit plan satisfies the one or more validation conditions comprises determining that interactions between different plan objects of the draft MSPD are not associated with semantic errors.

9. The computer-implemented method of claim 1, wherein:
the feedback comprises a predicted forecast of a least one of a risk level or a cost estimate associated with the draft benefit plan, and
the predicted forecast is generated by a machine learning model, of the one or more plan analysis tools, based on historical adjudication results associated with a set of previous claims adjudicated by the automatic claim adjudication system.

10. The computer-implemented method of claim 1, wherein the sample claims are at least one of:
a set of actual claims previously submitted in association with one or more other benefit plans,
a first set of simulated claims generated at random, or
a second set of simulated claims generated based on adjusting one or more attributes of the set of actual claims.

11. One or more computing devices comprising:
one or more processors; and
memory storing computer-executable instructions that, when executed by the one or more processors, cause the one or more processors to perform operations comprising:
receiving user input describing one or more parameters of one or more benefits of a draft benefit plan;
translating the user input into a draft machine structured plan description (MSPD) that defines the draft benefit plan and represents the one or more benefits as plan objects of the draft MSPD;
generating feedback associated with the draft benefit plan based on at least one of:
validating that the draft benefit plan, defined by the draft MSPD, satisfies one or more validation conditions, or
simulating automatic adjudication of sample claims based on the draft MSPD;
approving, based on the feedback:
the draft benefit plan as a final benefit plan, and
the draft MSPD as a final MSPD that defines the final benefit plan; and
providing the final MSPD to at least one of:
a plan documentation generator configured to automatically generate one or more plan documents based on the final MSPD, or
an automatic claim adjudication system configured to use the final MSPD to automatically adjudicate claims submitted in association with the final benefit plan.

12. The one or more computing devices of claim 11, wherein the user input is received via a user interface, and the user interface is configured with one or more constraints that define allowable values of the one or more parameters.

13. The one or more computing devices of claim 11, wherein the feedback includes at least one revision recommendation associated with one or more adjustments to at least one of the one or more parameters of the one or more benefits of the draft benefit plan.

14. The one or more computing devices of claim 13, wherein:
the operations further comprise automatically updating the draft MSPD based on the at least one revision recommendation, and
the draft benefit plan is approved as the final benefit plan, and the draft MSPD is approved as the final benefit plan, at least in part in response to automatically updating the draft MSPD based on the at least one revision recommendation.

15. The one or more computing devices of claim 11, wherein:
the operations further comprise:
receiving second user input in response to the feedback, wherein the second user input adjusts at least one of the one or more parameters of the one or more benefits of the draft benefit plan;
updating the draft MSPD based on the second user input; and
updating the feedback based on the updating of the draft MSPD, and
the draft benefit plan is approved as the final benefit plan, and the draft MSPD is approved as the final benefit plan, based at least in part on the updating of the feedback.

16. One or more non-transitory computer-readable media storing computer-executable instructions that, when executed by one or more processors, cause the one or more processors to perform operations comprising:
receiving user input describing one or more parameters of one or more benefits of a draft benefit plan;
translating the user input into a draft machine structured plan description (MSPD) that defines the draft benefit plan and represents the one or more benefits as plan objects of the draft MSPD;
generating feedback associated with the draft benefit plan based on at least one of:
validating that the draft benefit plan, defined by the draft MSPD, satisfies one or more validation conditions, or
simulating automatic adjudication of sample claims based on the draft MSPD;
approving, based on the feedback:
the draft benefit plan as a final benefit plan, and
the draft MSPD as a final MSPD that defines the final benefit plan; and
providing the final MSPD to at least one of:
a plan documentation generator configured to automatically generate one or more plan documents based on the final MSPD, or
an automatic claim adjudication system configured to use the final MSPD to automatically adjudicate claims submitted in association with the final benefit plan.

17. The one or more non-transitory computer-readable media of claim 16, wherein the feedback includes at least one revision recommendation associated with one or more adjustments to at least one of the one or more parameters of the one or more benefits of the draft benefit plan.

18. The one or more non-transitory computer-readable media of claim 17, wherein:
the operations further comprise automatically updating the draft MSPD based on the at least one revision recommendation, and
the draft benefit plan is approved as the final benefit plan, and the draft MSPD is approved as the final benefit plan, at least in part in response to automatically updating the draft MSPD based on the at least one revision recommendation.

19. The one or more non-transitory computer-readable media of claim 16, wherein:
the operations further comprise:
receiving second user input in response to the feedback, wherein the second user input adjusts at least one of the one or more parameters of the one or more benefits of the draft benefit plan;
updating the draft MSPD based on the second user input; and
updating the feedback based on the updating of the draft MSPD, and
the draft benefit plan is approved as the final benefit plan, and the draft MSPD is approved as the final benefit plan, based at least in part on the updating of the feedback.

20. The computer-implemented method of claim 1, wherein validating that the draft benefit plan satisfies the one or more validation conditions comprises determining that the plan objects of the draft MSPD correspond with a predefined list of known benefits.

* * * * *